(12) United States Patent
Yamada et al.

(10) Patent No.: US 11,950,211 B2
(45) Date of Patent: Apr. 2, 2024

(54) COMMUNICATION SYSTEM, MOBILE STATION DEVICE, AND COMMUNICATION METHOD

(71) Applicant: SHARP KABUSHIKI KAISHA, Sakai (JP)

(72) Inventors: Shohei Yamada, Sakai (JP); Toshizo Nogami, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 17/085,955

(22) Filed: Oct. 30, 2020

(65) Prior Publication Data

US 2021/0051633 A1  Feb. 18, 2021

Related U.S. Application Data

(63) Continuation of application No. 16/692,494, filed on Nov. 22, 2019, now Pat. No. 10,945,239, which is a
(Continued)

(30) Foreign Application Priority Data

Aug. 6, 2008  (JP) .................................. 2008-203361

(51) Int. Cl.
*H04W 72/04* (2023.01)
*H04L 5/00* (2006.01)
(Continued)

(52) U.S. Cl.
CPC ........... *H04W 72/04* (2013.01); *H04L 5/0094* (2013.01); *H04L 5/0098* (2013.01);
(Continued)

(58) Field of Classification Search
CPC ............... H04W 72/04; H04W 72/042; H04W 72/0453; H04L 5/001; H04L 5/0094; H04L 5/0098
See application file for complete search history.

(56) References Cited

U.S. PATENT DOCUMENTS 8,848,606 B2 * 9/2014 Yamada .............. H04W 72/042
370/328
9,844,041 B2  12/2017 Yamada
(Continued)

FOREIGN PATENT DOCUMENTS

| CN | 1666554 A | 9/2005 |
| CN | 1734976 A | 2/2006 |

(Continued)

OTHER PUBLICATIONS

3GPP TR 25.814 V7.1.0 (Sep. 2006), "3rd Generation Partnership Project; Technical Specification Group Radio Access Network; Physical layer aspects for evolved Universal Terrestrial Radio Access (UTRA) Release 7," pp. 1-132 (see pp. 13-15 and 57-58).
(Continued)

*Primary Examiner* — Kevin C. Harper
(74) *Attorney, Agent, or Firm* — Birch, Stewart, Kolasch & Birch, LLP

(57) ABSTRACT

A mobile station device includes an information acquisition unit that is configured to and/or programmed to acquire information, which specifies a system bandwidth and a carrier frequency of a second downlink carrier component different from a first downlink carrier component, transmitted using RRC signaling via a physical downlink shared channel within the first downlink carrier component and a communication unit that is configured to communicate with the base station device by aggregate use of both the first downlink carrier component and the second downlink carrier component, where the first downlink carrier component
(Continued)

and the second downlink carrier component have different carrier frequencies and each of the first downlink carrier component and the second downlink carrier component has its own downlink system bandwidth.

8 Claims, 20 Drawing Sheets

Related U.S. Application Data continuation of application No. 15/830,967, filed on Dec. 4, 2017, now Pat. No. 10,492,175, which is a continuation of application No. 14/263,871, filed on Apr. 28, 2014, now Pat. No. 9,844,041, which is a continuation of application No. 13/057,263, filed as application No. PCT/JP2009/003757 on Aug. 5, 2009, now Pat. No. 8,848,606.

(51) Int. Cl.
 H04W 72/0453 (2023.01)
 H04W 72/23 (2023.01)
(52) U.S. Cl.
 CPC ....... H04W 72/0453 (2013.01); H04W 72/23 (2023.01); H04L 5/001 (2013.01)

(56) References Cited

U.S. PATENT DOCUMENTS

| | | | |
|---|---|---|---|
| 10,492,175 B2 * | 11/2019 | Yamada | H04L 5/0044 |
| 10,945,239 B2 * | 3/2021 | Yamada | H04W 72/042 |
| 2003/0186700 A1 | 10/2003 | Torsner et al. | |
| 2004/0029532 A1 | 2/2004 | Schwarz et al. | |
| 2004/0033801 A1 | 2/2004 | Yi et al. | |
| 2004/0106430 A1 | 6/2004 | Schwarz et al. | |
| 2004/0203623 A1 | 10/2004 | Wu | |
| 2006/0013182 A1 | 1/2006 | Balasubramanian et al. | |
| 2006/0072503 A1 | 4/2006 | Kim et al. | |
| 2006/0153312 A1 | 7/2006 | Yun et al. | |
| 2006/0166677 A1 | 7/2006 | Derakshan et al. | |
| 2006/0291403 A1 | 12/2006 | Kahtava et al. | |
| 2007/0049278 A1 | 3/2007 | Lindoff et al. | |
| 2007/0049308 A1 | 3/2007 | Lindoff et al. | |
| 2007/0223611 A1 | 9/2007 | Ode et al. | |
| 2007/0264994 A1 | 11/2007 | Schwarz et al. | |
| 2008/0031191 A1 | 2/2008 | Kashima et al. | |
| 2008/0095106 A1 | 4/2008 | Malladi et al. | |
| 2008/0130485 A1 * | 6/2008 | Yang | H04L 5/0007 370/480 |
| 2008/0166724 A1 | 7/2008 | Wu et al. | |
| 2008/0240275 A1 | 10/2008 | Cai | |
| 2008/0247375 A1 * | 10/2008 | Muharemovic | H04W 72/0426 370/344 |
| 2009/0052357 A1 | 2/2009 | Suo et al. | |
| 2009/0109905 A1 | 4/2009 | Ahmadi | |
| 2009/0116434 A1 | 5/2009 | Lohr et al. | |
| 2009/0185632 A1 | 7/2009 | Cai et al. | |
| 2009/0262699 A1 | 10/2009 | Wengerter et al. | |
| 2009/0268831 A1 | 10/2009 | Onggosanusi et al. | |
| 2009/0325585 A1 | 12/2009 | Farajidana et al. | |
| 2010/0210218 A1 | 8/2010 | Iwamura et al. | |
| 2011/0051711 A1 | 3/2011 | Kishiyama et al. | |
| 2011/0081856 A1 | 4/2011 | Johansson et al. | |
| 2011/0111785 A1 | 5/2011 | Lindoff et al. | |
| 2012/0224532 A1 | 9/2012 | Suzuki et al. | |
| 2012/0243489 A1 | 9/2012 | Pirskanen et al. | |
| 2013/0083762 A1 | 4/2013 | Adachi et al. | |

FOREIGN PATENT DOCUMENTS

| | | |
|---|---|---|
| CN | 101053053 A | 10/2007 |
| CN | 101127747 A | 2/2008 |
| EP | 1 819 118 A2 | 8/2007 |
| EP | 1 855 424 A1 | 11/2007 |
| EP | 1 916 790 A1 | 4/2008 |
| EP | 1906689 A1 | 4/2008 |
| EP | 1878289 B1 | 7/2010 |
| EP | 2 262 333 A1 | 12/2010 |
| EP | 2 312 897 A1 | 4/2011 |
| GB | 2434279 B | 6/2008 |
| JP | 2005-524359 A | 8/2005 |
| JP | 2006-211645 A | 8/2006 |
| JP | 2010-11397 A | 1/2010 |
| JP | 2010-516160 A | 5/2010 |
| KR | 10-2008-0059976 A | 7/2008 |
| RU | 2289204 C2 | 12/2006 |
| WO | WO 2006/118414 A2 | 11/2006 |
| WO | WO 2007/025971 A1 | 3/2007 |
| WO | WO 2007/105914 A1 | 9/2007 |
| WO | WO 2008/023613 A1 | 2/2008 |
| WO | WO 2008/053302 A2 | 5/2008 |
| WO | WO 2008/085009 A1 | 7/2008 |
| WO | WO 2009/119834 A1 | 10/2009 |

OTHER PUBLICATIONS

3GPP TS 36.300 V.8,4,0 (Mar. 2008) , 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8), pp. 1-126.
Eurasian Search Report for Eurasian Application No. 201170148 dated Sep. 5, 2011, including an English translation.
U.S. Advisory Action issued in U.S. Appl. No. 13/057,263 dated Dec. 10, 2013.
U.S. Advisory Action issued in U.S. Appl. No. 13/057,263 dated Oct. 21, 2013.
U.S. Office Action issued in U.S. Appl. No. 13/057,263 dated Jan. 28, 2014.
U.S. Office Action issued in U.S. Appl. No. 13/057,263 dated May 23, 2013.
U.S. Office Action issued in U.S. Appl. No. 13/057,263 dated Nov. 29, 2012.
U.S. Office Action issued in U.S. Appl. No. 13/057,263 dated Sep. 13, 2013.
3GPP TR 25.892 V6.0.0 (Jun. 2004), 3rd Generation Partnership Project; Technical Specification Radio Access Network; Feasibility Study for Orthogonal Frequency Division Multiplexing (OFDM) for UTRAN enhancement (Release 6), pp. 1-91.
3GPP TS 36. 101 V8.2.0 (May 2008), 3rd Generation Partnership Project; Technical Specification Group Radio Access Network; Evolved Universal Terrestrial Radio Access (E-UTRA); User Equipment (UE) radio transmission and reception (Release 8); pp. 1-66.
3GPP TS 36.300 V8.5.0 (May 2008), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8), pp. 1-134.
3GPP TS 36.331 V8.2.0 (May 2008), 3rd Generation Partnership Project; Technical Specification Group Radio Access Network; Evolved Universal Terrestrial Radio Access (E-UTRA) Radio Resource Control (RRC); Protocol specification (Release 8), pp. 1-151.
3GPP TS 44.060 V7.12.0 (Mar. 2008), 3rd Generation Partnership Project; Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 7) pp. 1-547.
3GPP TS 45.005 V7.13.0 (Feb. 2008), 3rd Generation Partnership Project; Technical Specification Group GSM/EDGE Radio Access Network; Radio transmission and reception (Release 7), pp. 1-185.
3GPP TSG RAN IMT-Advanced Workshop, Shenzhen, China, Apr. 7-8, 2008, REV-080020, 3. Proposals for evolution, Framework for LTE-Advanced air-interface technology development, pp. 1-5.
3GPP TSG-RAN WG2 #63bis, Jun. 30-Jul. 4, Warsaw, PL, 7.4.10, Huawei, Discussion on Supplementary Carrier Controlling, R2-083520, pp. 1-2.

(56) References Cited

OTHER PUBLICATIONS

3GPP, "3rd Generation Partnership Project; Technical Specification Group Radio Access Network; Evolved Universal Terrestrial Radio . . . Specification (Release 8)", 3GPP TS 36.331, V8.00, Dec. 18, 2007, pp. 1-56.
3GPP, "Technical Specification", 3GPP TS 25.331 V5.22.1, Release 5, Aug. 5, 2008, pp. 1-1046.
Ericsson, "Considerations on Dual-Cell HSDPA Operation", 3GPP TSG RAN WG1 Meeting #52bis, R1-081545, Shenzhen, China, Mar. 31-Apr. 4, 2008, pp. 1-2.
Ericsson, "Introduction of measurement bandwidth in RRC specification", 3GPP TSG-RAN2 Meeting #61bis, R2-082004, Shenzen, China, Mar. 31-Apr. 4, 2008, pp. 1-6.
Final Office Action issued in corresponding U.S. Appl. No. 15/830,967 dated Mar. 22, 2019.
Huawei, "Carrier aggregation in Advanced E-UTRA", 3GPP TSG RAN WG1#53bis, R1-082448, Warsaw, Poland, Jun. 30-Jul. 4, 2008, (4 pages total).
Huawei, "Dual Cell deployment scenarios", 3GPP TSG-RAN WG2 Meeting #62, R2-082291, Kansas City, US, May 5-9, 2008, (3 pages total).
Non-Final Office Action issued in corresponding U.S. Appl. No. 15/830,967 dated Sep. 21, 2018.
Notice of Allowance issued in corresponding U.S. Appl. No. 16/692,494 dated Jul. 8, 2020.
Notice of Allowance issued in corresponding U.S. Appl. No. 16/692,494 dated Oct. 29, 2020.
Notice of Allowance issued in corresponding U.S. Appl. No. 15/830,967 dated Jul. 25, 2019.
Qualcomm Europe, "Confusing multiple PDCCH aggregation levels", 3GPP TSG-RAN WG1 #53bis, R1-082544, Warsaw, Poland, Jun. 30-Jul. 4, 2008, pp. 1-7.
Regis J. (Bud) Bates, GPRS: General Packet Radio Service, Oct. 17, 2019, p. 1.
TSG-RAN WG1 #53, Kansas City, MO, USA, May 5-9, 2008, Ericsson, A Discussion on Some Technology Components for LTE-Advanced, R1-082024, pp. 1-11.
TSG-RAN WG1 #53bis, Warsaw, Poland, Jun. 30-Jul. 4, 2008, R1-082468, Ericsson, Carrier aggregation in LTE-Advanced, pp. 1-6.
U.S. Advisory Action issued in U.S. Appl. No. 14/263,871 dated Jun. 25, 2015.
U.S. Notice of Allownce issued in U.S. Appl. No. 14/263,871 dated Aug. 22, 2017.
U.S. Office Action issued in U.S. Appl. No. 14/263,871 dated Aug. 14, 2015.
U.S. Office Action issued in U.S. Appl. No. 14/263,871 dated Jul. 5, 2016.
U.S. Office Action issued in U.S. Appl. No. 14/263,871 dated Mar. 22, 2016.
U.S. Office Action issued in U.S. Appl. No. 14/263,871 dated Mar. 6, 2015.
U.S. Office Action issued in U.S. Appl. No. 14/263,871 dated May 5, 2017.
U.S. Office Action issued in U.S. Appl. No. 14/263,871 dated Oct. 6, 2014.
ZTE, "Enhanced coding and modulation", 3GPP TSG RAN1 53 Meeting, Kansas, USA, May 5-9, 2008, (10 pages total).
3GPP TS 25.331 V5.13.0 (Jun. 2005), Release 5, p. 1-1042.
3GPP, "3rd Generation Partnership Project; Technical Specification Group Radio Access Network; Radio Interface Protocol Architecture (Release 8)," 3GPP TS 25.301, V8.2.0, May 2008, pp. 1-51.
Huawei, "Discussion on Dual Cell HSDPA Operation Principle," 3GPP TSG-RAN WG2 #62, R2-082288, Kansas City, USA, May 5-9, 2008, 2 pages total.

\* cited by examiner

COMMUNICATION SYSTEM, MOBILE STATION DEVICE, AND COMMUNICATION METHOD

This application is a continuation of application Ser. No. 16/692,494 filed on Nov. 22, 2019, which is a continuation of application Ser. No. 15/830,967, filed on Dec. 4, 2017, now U.S. Pat. No. 10,492,175, issued. Nov. 26, 2019, which is a continuation of application Ser. No. 14/263,871, filed on Apr. 28, 2014, now U.S. Pat. No. 9,844,041 issued Dec. 12, 2017, which is a continuation of application Ser. No. 13/057,263, filed on Feb. 2, 2011, now U.S. Pat. No. 8,848,606 issued on Sep. 30, 2014, which is the national phase of PCT International Application No. PCT/JP2009/003757 filed Aug. 5, 2009, which claims benefit of priority under 35 U.S.C. § 119(a) to Japanese Patent Application 2008-203361 filed Aug. 6, 2008. The entire contents of each of the above-identified applications are hereby incorporated by reference.

TECHNICAL FIELD

The present invention relates to a communication system, a mobile station device, and a communication method.

BACKGROUND ART

Third Generation Partnership Project (3GPP) is a project in which specifications of mobile phone systems are studied and created. 3GPP is based on an evolved network of wideband code division multiple access (W-CDMA) and a global system for mobile communications (GSM).

In 3GPP, a W-CDMA scheme has been standardized as a $3^{rd}$ generation cellular mobile communication scheme and its services have been sequentially initiated. Also, high-speed downlink packet access (HSDPA) having a higher communication rate has been standardized and its services have been initiated.

In 3GPP, evolved universal terrestrial radio access (EUTRA), which is the evolution of 3G radio access technology, has been studied.

In EUTRA, an orthogonal frequency division multiple access (OFDMA) scheme has been proposed as a downlink communication scheme. OFDMA is a scheme of performing multiplexing of users by subcarriers orthogonal to each other.

In the OFDMA scheme, a technique called an adaptive modulation and coding scheme (AMCS) based on adaptive radio link control (link adaptation) of channel coding or the like is applied.

The AMCS is a scheme of switching radio transmission parameters (also referred to as AMC modes) of an error correction scheme, a coding rate of error correction, a data modulation multinary number, and the like in response to channel qualities of mobile station devices so as to efficiently perform high-speed packet data transmission.

The channel qualities of the mobile station devices are fed back to a base station device with use of a channel quality indicator (CQI).

FIG. 19 is a diagram illustrating a channel configuration used in a radio communication system of the related art. This channel configuration is used in a radio communication system such as the EUTRA (see Non-Patent Document 1). The radio communication system shown in FIG. 19 includes a base station device 1000 and mobile station devices 2000a, 2000b, and 2000c. R01 denotes a range where the base station device 1000 is communicable. The base station device 1000 communicates with a mobile station device, which exists in the range R01.

In EUTRA, a physical broadcast channel (PBCH), a physical downlink control channel (PDCCH), a physical downlink shared channel (PDSCH), a physical multicast channel (PWII), a physical control format indicator channel (PCFICH), and a physical hybrid automatic repeat request (ARQ) indicator channel (PHICH) are used in a downlink through which a signal is transmitted from the base station device 1000 to the mobile station devices 2000a to 2000c.

In EUTRA, a physical uplink shared channel (PUSCH), a physical uplink control channel (PUCCH), and a physical random access channel (MACH) are used in an uplink through which signals are transmitted from the mobile station devices 2000a to 2000c to the base station device 1000.

FIG. 20 is a diagram showing an example of a band used in the radio communication system of the related art. In FIG. 20, the horizontal axis represents a frequency and the vertical axis represents a carrier frequency. In FIG. 20, the carrier frequency is f11. The base station device and the mobile station device perform communication using one continuous band W11 in a frequency axis. A method using the above-described band is used in the general radio communication system such as EUTRA.

FIG. 21 is a diagram showing another example of bands used in the radio communication system of the related art. In FIG. 21, the horizontal axis represents a frequency. In FIG. 21, the base station device and the mobile station device perform communication using a plurality of discontinuous bands W21 and W22 in the frequency axis. As shown in FIG. 21, aggregation is referred to as a composite use of a plurality of discontinuous bands in the frequency axis.

However, it the base station device and the mobile station device perform communication using a plurality of discontinuous frequency bands as shown in FIG. 21 in the radio communication system known in the related art, the mobile station device needs to specify a plurality of frequency bands by communicating with the base station device. Thus, there is a problem in that communication may not be rapidly initiated since information to be transmitted from the base station device to the mobile station device increases at the initiation of communication.

Non-Patent Document 1: 3GPP TS (Technical Specification) 36.300, V8.4.0 (2008-03), Technical Specification Group Radio Access Network, Evolved Universal Terrestrial Radio Access (E-UTRA) and Evolved Universal Terrestrial Radio Access Network (E-UTRAN); Overall description; Stage 2 (Release 8)

DISCLOSURE OF INVENTION

Problem to be Solved by the Invention

The present invention has been made in view of the above-described circumstances, and an object of the invention is to provide a communication system, a mobile station device, and a communication method that can reduce information to be transmitted from a base station device to the mobile station device at the initiation of communication and that can rapidly initiate communication.

Means for Solving the Problem (1) The present invention has been made to solve the above-described problems. According to an aspect of the present invention, here is provided a communication system including a base station device and a mobile station device, wherein the base station device includes: a signal transmission unit which transmits a signal including information, which specifies at least one second frequency band different from a first frequency band, to the mobile station device with use of RRC signaling via a physical downlink shared channel within the first frequency band, and the mobile station device includes: an information acquisition unit which acquires the information, which specifies the at least one second frequency band different from the first frequency band, to be transmitted using the RRC signaling via the physical downlink shared channel within the first frequency band; a frequency band specification unit which specifies the second frequency band based on the information acquired by the information acquisition unit; and a communication unit which communicates with the base station device with use of the first frequency band or the second frequency band.

(2) According to another aspect of the present invention, there is provided a mobile station device which communicates with a base station device, the mobile station device including: an information acquisition unit which acquires information, which specifies at least one second frequency band different from a first frequency band, transmitted using RRC signaling via a physical downlink shared channel within the first frequency band; a frequency band specification unit which specifies the second frequency band based on the information acquired by the information acquisition unit; and a communication unit which communicates with the base station device with use of the first frequency band or the second frequency band.

(3) In the mobile station device according to the aspect of the present invention, the frequency band specification unit may specify whether or not to include a specific physical channel located within the second frequency band based on the information acquired by the information acquisition unit.

(4) In the mobile station device according to the aspect of the present invention, a common control channel may be used as a logical channel, which carries the RRC signaling.

(5) In the mobile station device according to the aspect of the present invention, a dedicated control channel may be used as a logical channel, which carries the RRC signaling.

(6) According to still another aspect of the present invention, there is provided a communication method using a base station device and a mobile station device, the communication method including: transmitting, by the base station device, a signal including information, which specifies at least one second frequency band different from a first frequency band, to the mobile station device with use of RRC signaling via a physical downlink shared channel within the first frequency band, acquiring, by the mobile station device, the information, which specifies the at least one second frequency band different from the first frequency band, to be transmitted using the RRC signaling via the physical downlink shared channel within the first frequency band; specifying, by the mobile station device, the second frequency band based on the information acquired in the acquisition; and communicating, by the mobile station device, with the base station device with use of the first frequency band or the second frequency band.

Effect of the Invention

A communication system, a mobile station device, and a communication method of the present invention can reduce information to be transmitted from a base station device to the mobile station device at the initiation of communication and can rapidly initiate communication.

BEST MODE FOR CARRYING OUT THE INVENTION

First Embodiment

First, the first embodiment of the present invention will be described. According to the first embodiment of the present invention, a radio communication system includes one or more base station devices and one or more mobile station devices, and radio communication is performed therebetween. One base station device constitutes one or more cells. One or more mobile station devices can be accommodated in one cell.

Figure 1:
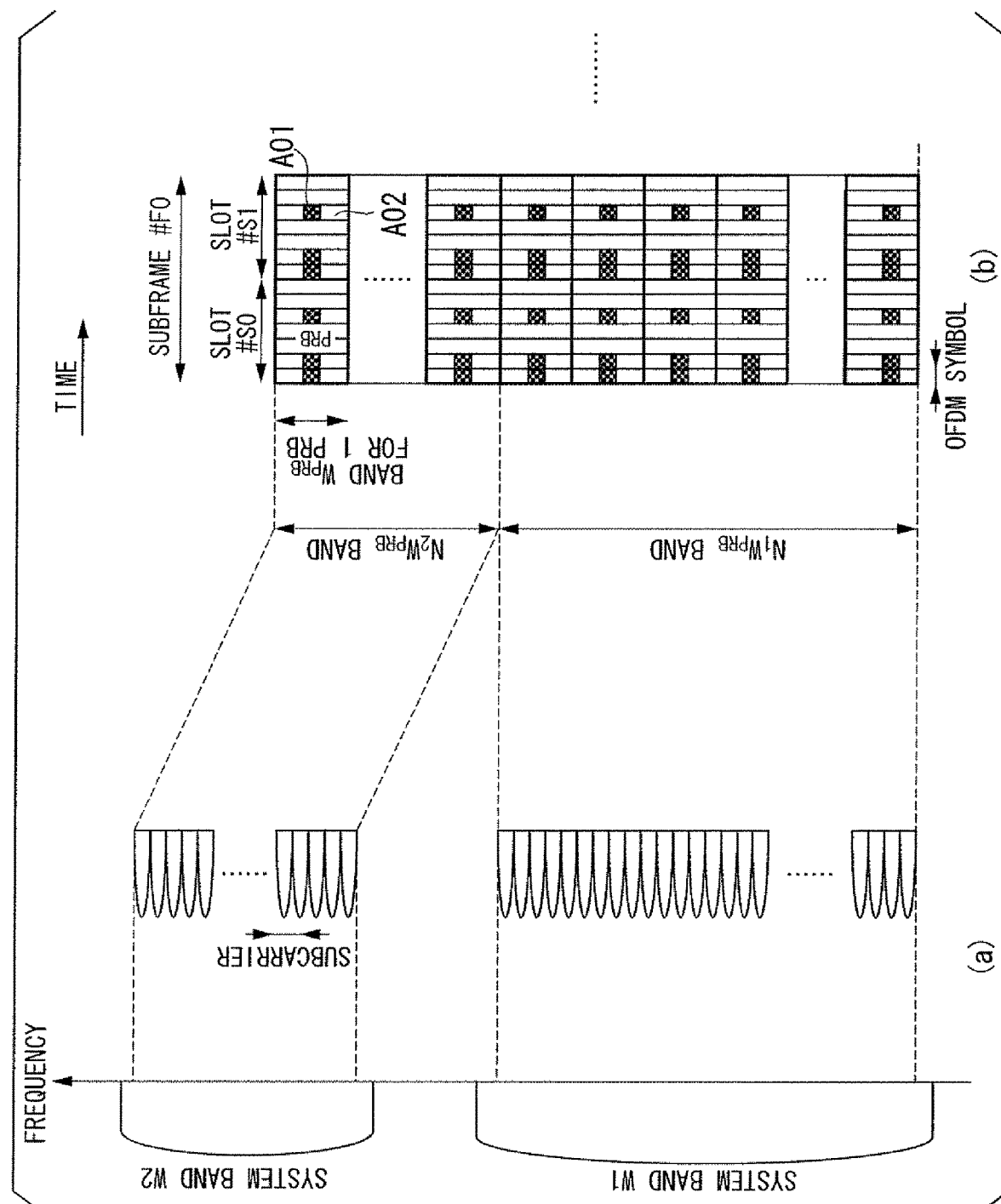
FIG. 1 is a diagram showing a method of arranging physical resource blocks (PRBs) according to a first embodiment of the present invention.

FIGS. 1(a) and 1(b) are diagrams showing a method of arranging PRBs of a downlink according to the first embodiment of the present invention. Here, a broadband system using a plurality of discontinuous system bands (occupancy bands) will be described. An example of a method of arranging PRBs, which are allocation units of a user, will be also described. In FIG. 1(a), the vertical axis represents a frequency. In FIG. 1(b), the horizontal axis represents a time and the vertical axis represents a frequency.

As shown in FIG. 1(a), a plurality of system bands (here, system bands W1 and W2) are used when the base station device and the mobile station device perform communication in the first embodiment of the present invention. A plurality of subcarriers are included in each of the system band W1 and the system band W2.

FIG. 1(b) shows an example of a configuration of a subframe (subframe #F0 whose subframe number is 0), which is a transmission unit in orthogonal frequency division multiple (OFDM) that is a type of multicarrier communication scheme.

One subframe includes at least one slot. Here, for example, subframe #F0 includes two slots #S0 and #S1.

The slot includes at least one OFDM symbol. Here, one slot #S0 or #S1 includes 7 OFDM symbols.

One slot is divided into a plurality of blocks in a frequency axis. A predetermined number of subcarriers constitute one PRB as a unit in the frequency axis.

A unit constituted by one subcarrier and one OFDM symbol is referred to as a resource element. A modulation symbol or the like is mapped to each resource element by resource mapping processing in a physical layer.

As described above, the PRBs are regions into which a subframe, which is a transmission unit, is divided in a grid pattern on two dimensions of the frequency and the time. Hereinafter, the case where each PRB has a uniform bandwidth $W_{PBR}$ in the frequency axis will be described. As shown in FIG. 1(b), a downlink reference signal A01 or a physical downlink channel A02 is arranged in the PRB.

When one broadband system is operated by compositely using a plurality of discontinuous bands W1 and W2 shown in FIG. 1(a), a natural number of PRBs are arranged in each of the plurality of bands W1 and W2 on the frequency axis in the first embodiment of the present invention. FIGS. 1(a) and (b) show the case where the system uses two downlink bands of the system band W1 and the system band W2. $N_1$ ($N_1$ is a natural number) PRBs are arranged in the system band W1, and $N_2$ ($N_2$ is a natural number) PRBs are arranged in the system band W2.

For example, the bandwidth of one of the two system bands allowed for the system is W1 and the bandwidth of the other system band is W2. In a system in which a PRB bandwidth $W_{PRB}$ is set to a fixed value, N1 is set to a natural number that is less than or equal to ($W_1/W_{PRB}$), and N2 is set to a natural number that is less than or equal to ($W_2/W_{PBR}$). Thereby, the system bands are used so that $N_1$ PRBs are arranged in a band of $N_1 W_{RPB}$ within the W1 band and $N_2$ PRBs are arranged in a band of $N_2 W_{RPB}$ within the W2 band.

Alternatively, in a system in which a PRB bandwidth $W_{PRB}$ is a parameter capable of being set for each base station device (or each region), which is a transmitter, $W_{PRB}$ is set as $W1/N_1$ using a predetermined natural number $N_1$ or is set as $W2/N_2$ using a predetermined natural number $N_2$. Here, W1 and W2 are use bandwidths considering guard bands.

Figure 2:
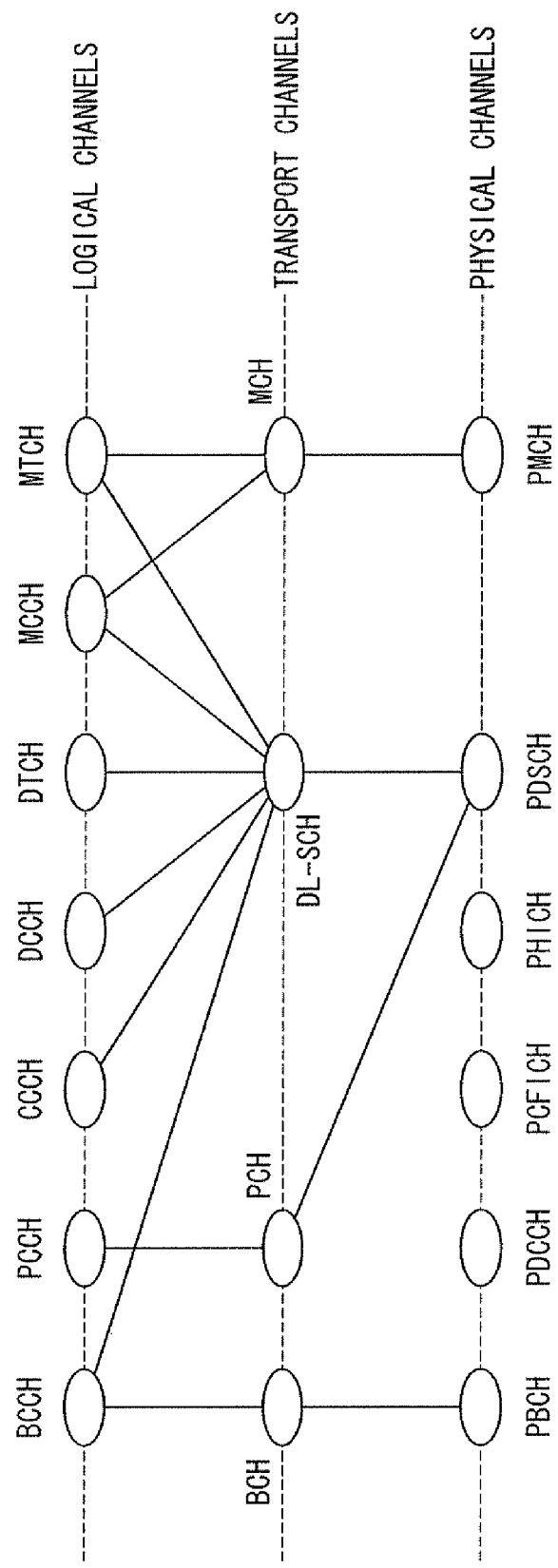
FIG. 2 is a diagram showing a downlink channel configuration used in a communication system according to the first embodiment of the present invention.
Figure 3:
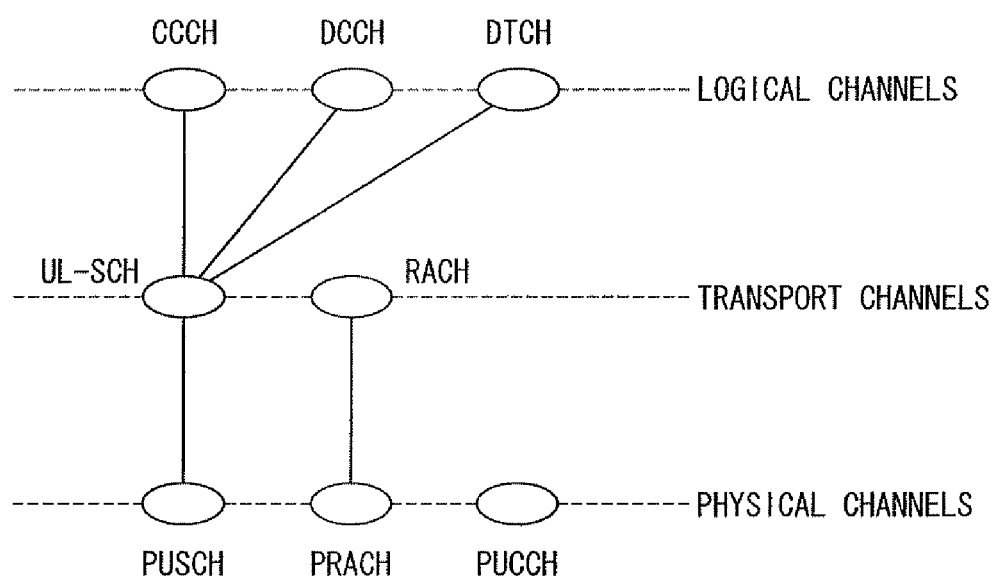
FIG. 3 is a diagram showing an uplink channel configuration used in a communication system according to the first embodiment of the present invention.

FIG. 2 is a diagram showing a downlink channel configuration used in the communication system according to the first embodiment of the present inventions. FIG. 3 is a diagram showing an uplink channel configuration used in the communication system according to the first embodiment of the present invention. Downlink channels shown in FIG. 2 and uplink channels shown in FIG. 3 respectively include logical channels, transport channels, and physical channels.

The logical channel defines a type of data transmission service to be transmitted/received to/from a medium access control (MAC) layer. The transport channel defines what is a characteristic of data to be transmitted by a radio interface and how data is transmitted. The physical channel is a physical channel that carries the transport channel.

The logical channels of the downlink include a broadcast control channel (BCCH), a paging control channel (PCCH), a common control channel (CCCH), a dedicated control channel (DCCH), a dedicated traffic channel (DTCH), a multicast control channel (MCCH), and a multicast traffic channel (MTCH).

The logical channels of the uplink include a CCCH, a DCCH, and a DTCH.

The transport channels of the downlink include a broadcast channel (BCH), a paging channel (PCH), a downlink shared channel (DL-SCH), and a multicast channel (MCH).

The transport channels of the uplink include an uplink shared channel (UL-SCH) and a random access channel (RACE).

The physical channels of the downlink include a PBCH, a PDCCH, a PDSCH, a PMCH, a PCFICH, and a PHICH.

The physical channels of the uplink include a PUSCH, a PRACH, and a PUCCH.

Figure 19:
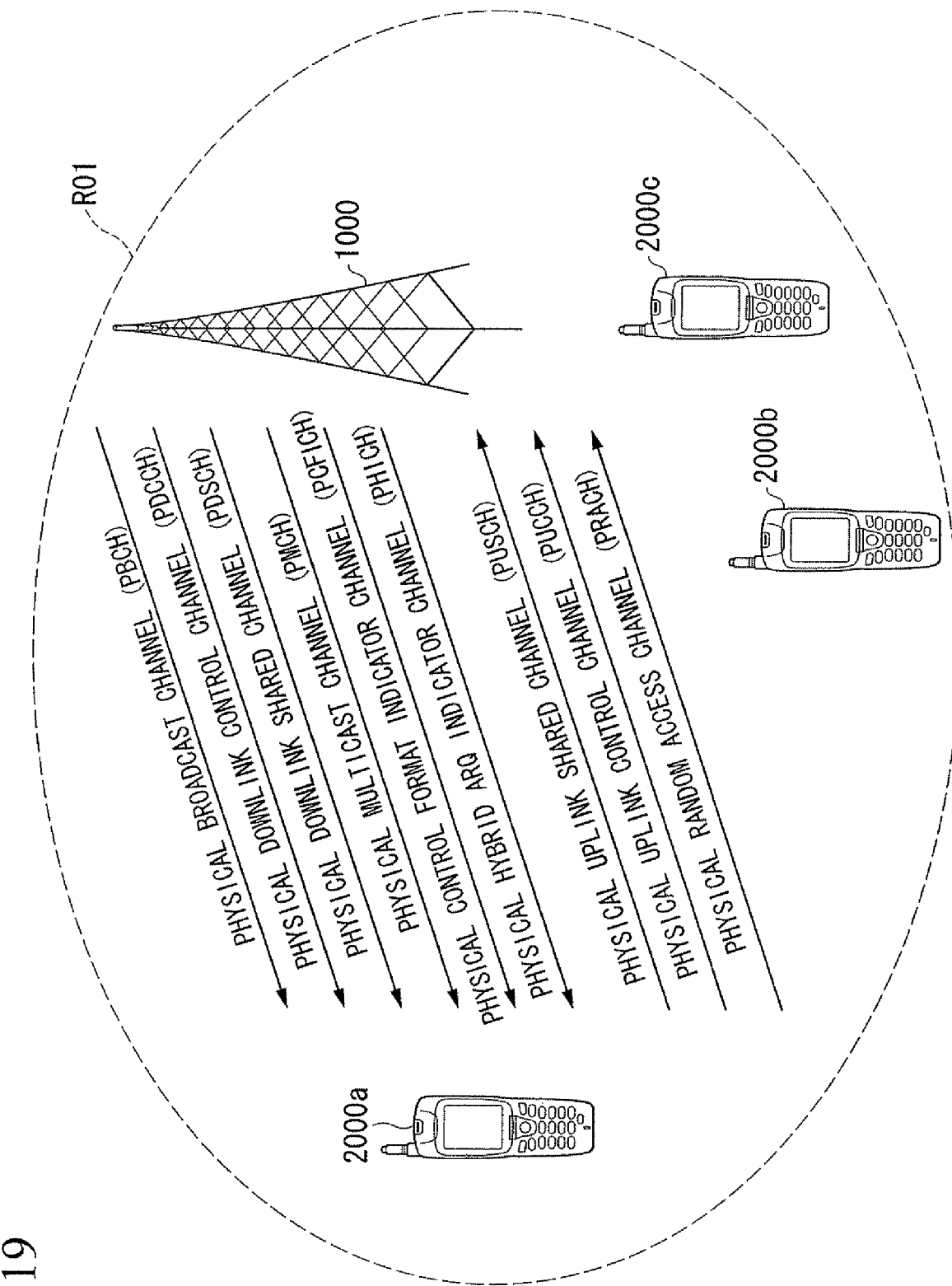
FIG. 19 is a diagram illustrating a channel configuration used in a radio communication system of the related art.
Figure 20:
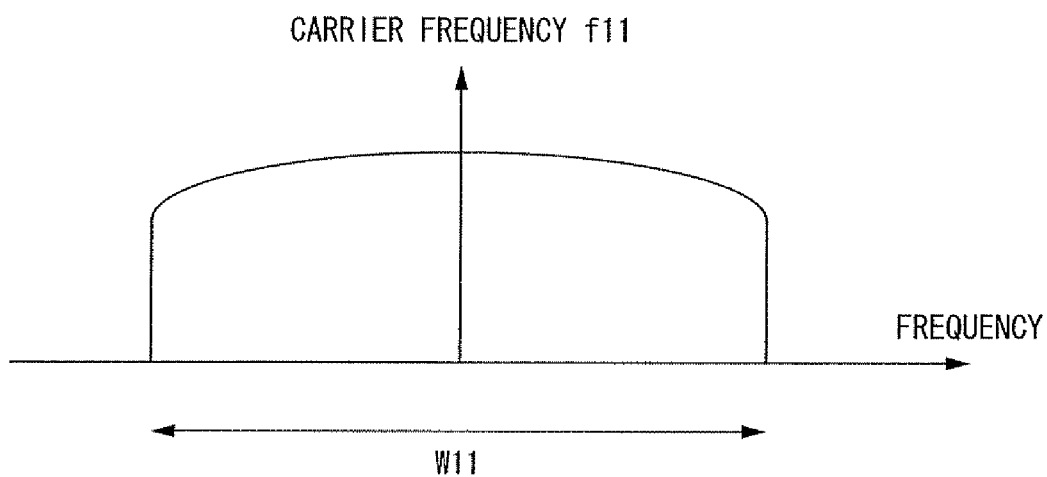
FIG. 20 is a diagram showing an example of a band used in a radio communication system of the related art.
Figure 21:
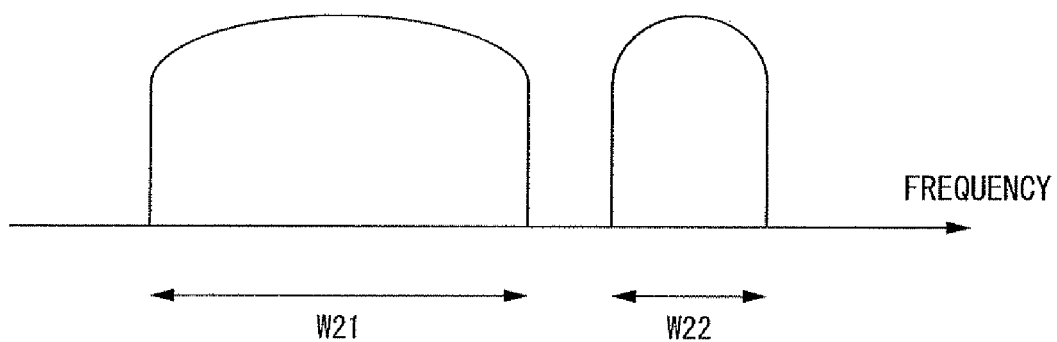
FIG. 21 is a diagram showing another example of bands used in a radio communication system of the related art.

These channels are transmitted and received between the base station device and the mobile station device as shown in FIG. 19 described in the related art.

Next, the logical channels will be described. The BCCH is a downlink channel that is used to broadcast system control information. The PCCH is a downlink channel that is used to transmit paging information, and is used when a network does not know a cell position of the mobile station device.

The CCCH is a channel that is used to transmit control information between the mobile station device and the network, and is used by the mobile station device that does not have a radio resource control (RRC) connection with the network.

The DCCH is a point-to-point two-way channel that is used to transmit individual control information between the mobile station device and the network. The DCCH is used by the mobile station device having the RRC connection.

The DTCH is a point-to-point two-way channel, and is used for transmission of user information (unicast data) in a dedicated channel of one mobile station device.

The MCCH is a downlink channel that is used for point-to-multipoint transmission of multimedia broadcast multicast service (NBMS) control information from the network to the mobile station device. This is used for an MBMS service that provides a point-to-multipoint service.

MBMS service transmission methods include single-cell point-to-multipoint (SCPTM) transmission and multimedia broadcast multicast service single frequency network (MBSFN) transmission.

The MBSFN transmission is a simultaneous transmission technique of simultaneously transmitting identifiable waveforms (signals) from a plurality of cells. On the other hand, the SCPTM transmission is a method of transmitting the MBMS service by one base station device.

The MCCH is used in one or a plurality of MTCHs. The MTCH is a downlink channel that is used for point-to-multipoint transmission of traffic data (MBMS transmission data) from the network to the mobile station device.

The MCCH and the MTCH are used only by a mobile station device, which receives MBMS.

Next, the transport channels will be described. The BCH is broadcast to the entire cell by a fixed and predefined transmission format. In the DL-SCH, hybrid automatic repeat request (HAM)), dynamic adaptive radio link control, discontinuous reception (DRX), and MBMS transmission are supported and need to be broadcast to the entire cell.

In the DL-SCH, beamforming is usable, and dynamic resource allocation and quasi-static resource allocation are supported. In the PCH, the DRX is supported and needs to be broadcast to the entire cell.

The PCB is mapped to a physical resource that is dynamically used for a traffic channel or another control channel, that is, the PDSCH.

The MCH needs to be broadcast to the entire cell. In the MCH, MBMS single frequency network (MBSFN) combining of MBMS transmissions from a plurality of cells, allocation of a quasi-static resource of a time frame using an extended cyclic prefix (CP), or the like is supported.

In the UL-SCH, HARQ and dynamic adaptive radio link control are supported. In the UL-SCH, beamforming is usable. Dynamic resource allocation and quasi-static resource allocation are supported. In the RACH, limited control information is transmitted and a collision risk exists.

Next, the physical channels will be described. The PBCH is mapped to the BCH at an interval of 40 milliseconds. Blind detection of the timing of 40 milliseconds is applied. That is, for timing presentation, explicit signaling may not be performed. A subframe including the PBCH can be decoded only by the subframe. That is, it is self-decodable.

The PDCCH is a channel that is used to notify a mobile station device of PDSCH resource allocation, HARQ information for downlink data, and uplink transmission permission (uplink grant) in PUSCH resource allocation.

The PDSCH is a channel that is used to transmit downlink data or paging information. The PMCH is a channel that is used to transmit the MCH. A downlink reference signal, an uplink reference signal, and a physical downlink synchronization signal are separately arranged.

The PUSCH is a channel that is used to mainly transmit the UL-SCH. When the base station device 100 schedules the mobile station device 200, a channel feedback report (a downlink channel quality indicator (CQI), a precoding matrix indicator (PMI), or a rank indicator (RI)) or an HARQ acknowledgement (ACK)/negative acknowledgement (NACK) to downlink transmission is also transmitted using the PUSCH.

The MACH is a channel that is used to transmit a random access preamble, and has a guard time. The PUCCH is a channel that is used to transmit the channel feedback report (CQI, PMI, and RI), a scheduling request (SR), an HARQ ACK/NACK to the downlink transmission, and the like.

The PCFICH is a channel that is used to notify the mobile station device of the number of OFDM symbols used for the PDCCH, and is transmitted in each subframe.

The PHICH is a channel that is used to transmit an HARQ ACK/NACK to uplink transmission.

Next, channel mapping by the communication system according to the first embodiment of the present invention will be described.

As shown in FIG. 2, mapping of the transport channel and the physical channel is performed in the downlink as follows. The BCH is mapped to the PBCH.

The MCH is mapped to the PMCH. The PCH and the DL-SCH are mapped to the PDSCH.

The PDCCH, the PHICH, and the PCFICH are independently used as the physical channels.

On the other hand, in the uplink, mapping of the transport channel and the physical channel is performed as follows. The UL-SCH is mapped to the PUSCH.

The RACH is mapped to the PRACH. The PUCCH is independently used as the physical channel.

In the downlink, mapping of the logical channel and the transport channel is performed as follows. The PCCH is mapped to the DL-SCH.

The BCCH is mapped to the BCH and the DL-SCH. The CCCH, the DCCH, and the DTCH are mapped to the DL-SCH.

The MCCH is mapped to the DL-SCH and the MCH. The MTCH is mapped to the DL-SCH and the MCH.

Mapping from the MCCH and the MTCH to the MCH is performed upon MBSFN transmission. On the other hand, this mapping is mapped to the DL-SCI upon SCPTM transmission.

On the other hand, in the uplink, mapping of the logical channel and the transport channel is performed as follows. The CCCH, the DCCH, and the DTCH are mapped to the UL-SCH. The RACH is not mapped to the logical channel.

Next, a frame structure used in the radio communication system according to the first embodiment of the present invention will be described.

Figure 4:
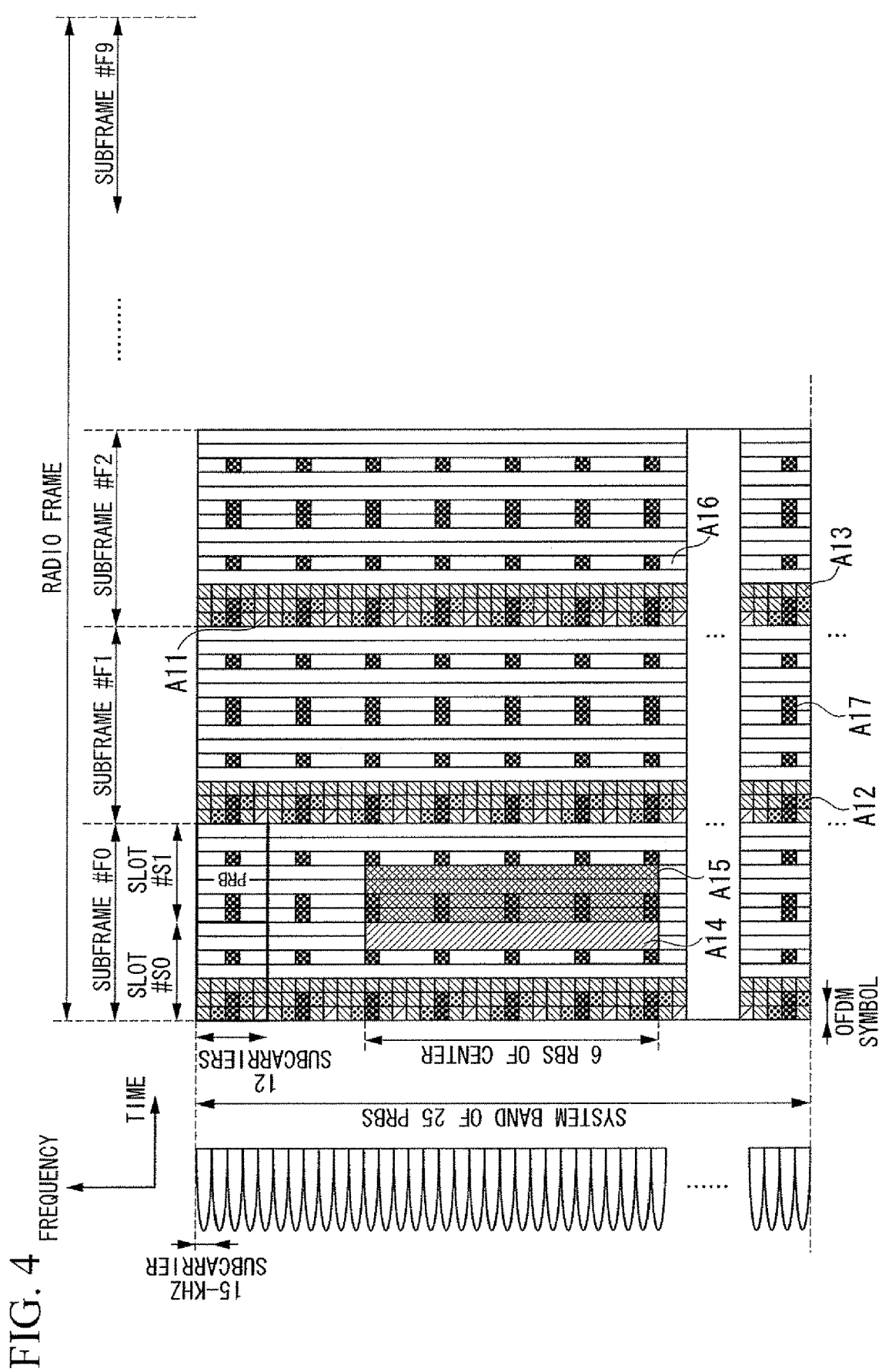
FIG. 4 is a diagram showing a frame structure used in a downlink of a radio communication system according to the first embodiment of the present invention.
Figure 5:
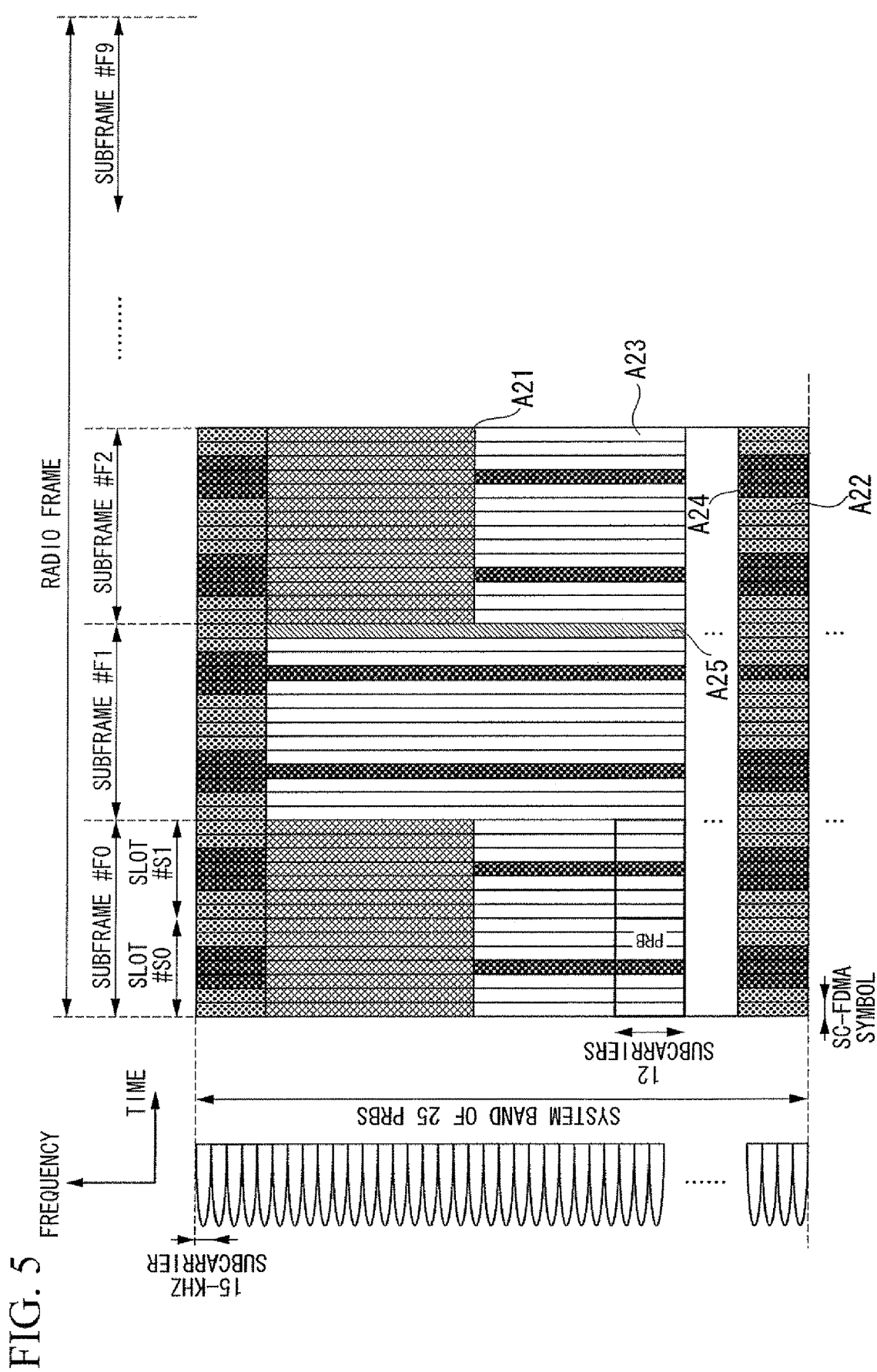
FIG. 5 is a diagram showing a frame structure used in an uplink of the radio communication system according to the first embodiment of the present invention.

FIG. 4 is a diagram showing a frame structure used in the downlink of the radio communication system according to the first embodiment of the present invention. FIG. 5 is a diagram showing a frame structure used in the uplink of the radio communication system according to the first embodiment of the present invention. In FIGS. 4 and 5, the horizontal axis represents a time and the vertical axis represents a frequency.

A radio frame to be identified by a system frame number (SFN) is constituted by 10 milliseconds (10 ms). One subframe is constituted by 1 millisecond (1 ms). The radio frame includes 10 subframes #F0 to #F09.

As shown in FIG. 4, a PCFICH A11, a PHICH A12, a PDCCH A13, a physical downlink synchronization signal A14, a PBCH A15, a PDSCH/PMCH A16, and a downlink reference signal A17 are arranged in the radio frame that is used in the downlink.

As shown in FIG. 5, a PRACH A21, a PUCCH A22, a PUSCH A23, an uplink demodulation reference signal A24, and an uplink measurement reference signal A25 are arranged in the radio frame that is used in the uplink.

One subframe (for example, subframe #F0) is separated into two slots #S0 and #S1. When a normal CP is used, a downlink slot includes 7 OFDM symbols (see FIG. 4), and an uplink slot includes 7 single carrier-frequency division multiple access (SC-FDMA) symbols (see FIG. 5).

If an extended CP (also referred to as a long CP) is used, the downlink slot includes 6 OFDM symbols and the uplink slot includes 6 SC-FDMA symbols.

One slot is divided into a plurality of blocks in the frequency axis. One PRB is constituted using twelve 15-kHz subcarriers as a unit in the frequency axis. In response to a system bandwidth, 6 to 110 PRBs are supported. FIGS. 4 and 5 show the case where the number of PRBs is 25. In the uplink and the downlink, different system bandwidths may be used. By the aggregation, the entire system bandwidth may be 110 or more PRBs.

Resource allocations of the downlink and the uplink are performed in a subframe unit in a time axis and in a PRB unit in the frequency axis. That is, two slots within a subframe are allocated in one resource allocation signal.

A unit constituting a subcarrier and an OFDM symbol or a unit constituting a subcarrier and an SC-FDMA symbol is referred to as a resource element. In resource mapping processing of a physical layer, a modulation symbol or the like is mapped to each resource element.

In processing of a physical layer of the downlink transport channel, the assignment of 24-bit cyclic redundancy check (CRC) to the PDSCH, channel coding (transmission channel coding), physical-layer HARQ processing, channel interleaving, scrambling, modulation (quadrature phase shift keying (QPSK), 16 quadrature amplitude modulation (16QAM), or 64QAM), layer mapping, precoding, resource mapping, antenna mapping, and the like are performed.

On the other hand, in processing of a physical layer of the uplink transport channel, the assignment of 24-bit CRC to the PUSCH, channel coding (transmission channel coding), physical-layer HARQ processing, scrambling, modulation (QPSK, 16QAM, or 64QAM), resource mapping, antenna mapping, and the like are performed.

The PDCCH, the PHICH, and the PCFICH are arranged in first 3 or fewer OFDM symbols.

In the PDCCH, transport format, resource allocation, and HARQ information for the DL-SCH and the PCH is transmitted. The transport format prescribes a modulation scheme, a coding scheme, a transport block size, and the like.

In the PDCCH, transport format, resource allocation, and HARQ information for the UL-SCH is transmitted.

A plurality of PDCCHs are supported, and the mobile station device monitors a set of PDCCHs.

The PDSCH allocated by the PDCCH is mapped to the same subframe as that of the PDCCH.

The PUSCH allocated by the PDCCH is mapped to a subframe of a predefined position. For example, if a downlink subframe number of the PDCCH is N, it is mapped to uplink subframe No. N+4.

In uplink/downlink resource allocation by the PDCCH, the mobile station device is specified using 16-bit MAC-layer identification information (MAC ID). That is, the 16-bit MAC ID is included in the PDCCH.

A downlink reference signal (a downlink pilot channel) to be used for measurement of a downlink state and demodulation of downlink data is arranged in first and second OFDM symbols of each slot and a third OFDM symbol from behind.

On the other hand, an uplink demodulation reference signal (a demodulation pilot (demodulation reference signal: DRS)) to be used for demodulation of the PUSCH is transmitted in a fourth SC-FDMA symbol of each slot.

An uplink measurement reference signal (a scheduling pilot (sounding reference signal: SRS)) to be used for measurement of an uplink state is transmitted in a last SC-FDMA symbol of a subframe.

A PUCCH demodulation reference signal is defined in each physical uplink control channel format, and is transmitted in third, fourth and fifth SC-FDMA symbols of each slot or second and sixth SC-FDMA symbols of each slot.

The PBCH and the downlink synchronization signal are arranged in a band of 6 physical resource blocks in the center of the system band. The physical downlink synchronization signal is transmitted in sixth and seventh OFDM symbols of each slot of subframes of a first subframe (subframe #F0) and a fifth subframe (subframe #F4).

The PBCH is transmitted in fourth and fifth OFDM symbols of the first slot (slot #S0) and first and second OFDM symbols of the second slot (slot #S1) of the first subframe (subframe #F0).

The PRACH is constituted by a bandwidth of 6 physical resource blocks in the frequency axis and 1 subframe in the time axis. The PRACH is transmitted for requests (an uplink resource request, an uplink synchronization request, a downlink data transmission resumption request, a handover request, a connection setup request, a reconnection request, an MBMS service request, and the like) on various reasons from the mobile station device to the base station device.

The PUCCH is arranged in two ends of the system band and is constituted in a PRB unit. Frequency hopping is performed so that the two ends of the system band are alternately used between slots.

Figure 6:
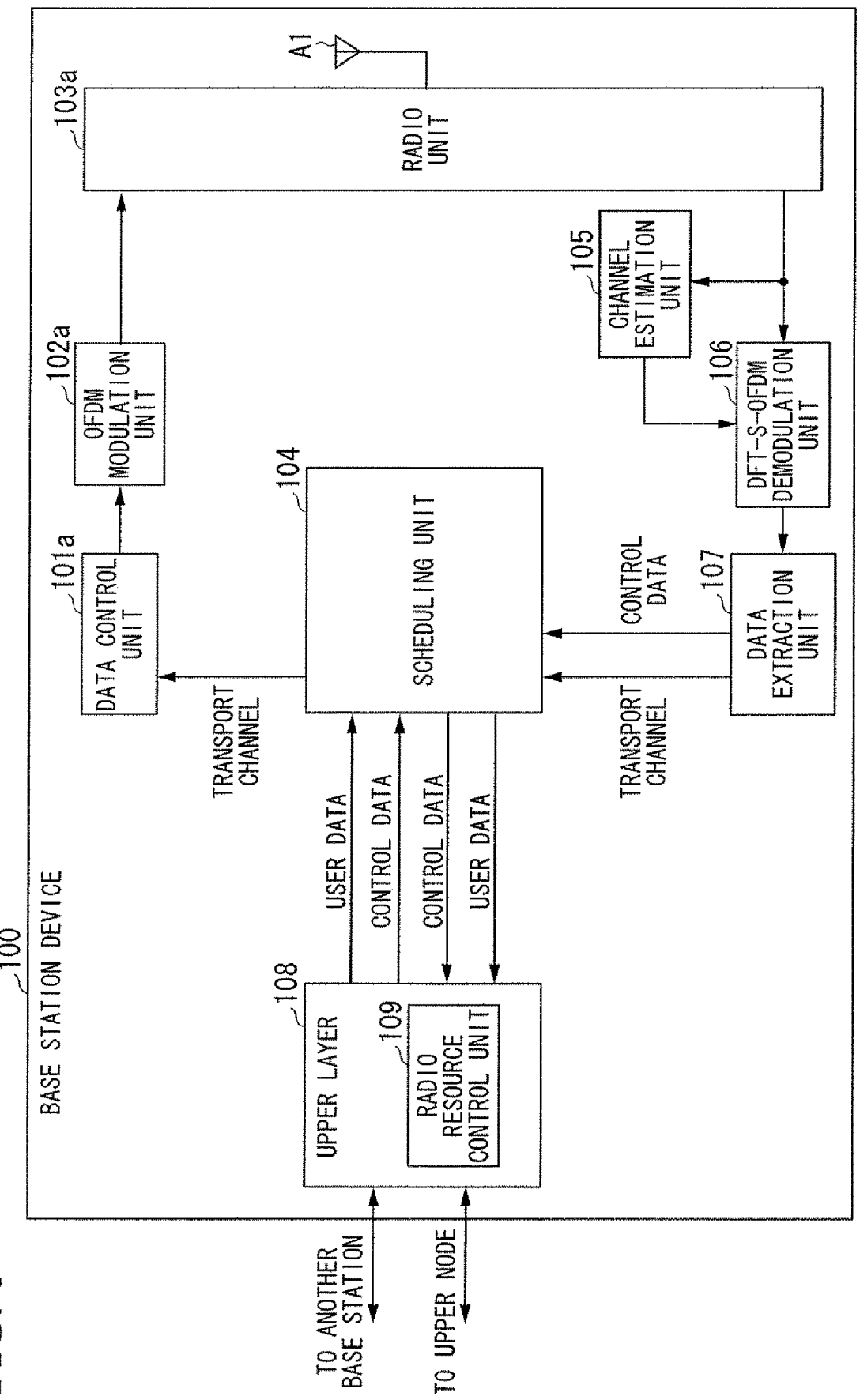
FIG. 6 is a schematic block diagram showing a configuration of a base station device 100 according to the first embodiment of the present invention.

FIG. 6 is a schematic block diagram showing a configuration of the base station device 100 according to the first embodiment of the present invention. The base station device 100 includes a data control unit 101a, an OFDM modulation unit 102a, a radio unit 103a, a scheduling unit 104, a channel estimation unit 105, a DFT-S-OFDM (DFT-Spread-OFDM) demodulation unit 106, a data extraction unit 107, an upper layer 108, and an antenna unit A1.

The radio unit 103a, the scheduling unit 104, the channel estimation unit 105, the DFT-S-OFDM demodulation unit 106, the data extraction unit 107, the upper layer 108, and the antenna unit A1 constitute a reception unit. The data control unit 101a, the OFDM modulation unit 102a, the radio unit 103a, the scheduling unit 104, the upper layer 108, and the antenna unit A1 constitute a transmission unit.

The antenna unit A1, the radio unit 103a, the channel estimation unit 105, the DFT-S-OFDM demodulation unit 106, and the data extraction unit 107 perform processing of the physical layer of the uplink. The antenna unit A2, the data control unit 101a, the OFDM modulation unit 102a, and the radio unit 103a perform processing of the physical layer of the downlink.

The data control unit 101a acquires the transport channel from the scheduling unit 104. The data control unit 101a maps the transport channel and a signal and a channel generated in the physical layer based on scheduling information input from the scheduling unit 104 to the physical channel based on the scheduling information input from the scheduling unit 104. Data mapped as described above is output to the OFDM modulation unit 102a.

The OFDM modulation unit 102a performs OFDM signal processing such as coding, data modulation, serial/parallel conversion of an input signal, inverse fast Fourier transform (IFFT) processing, CP insertion, filtering, and the like for data input from the data control unit 101a based on the scheduling information (including downlink PRB allocation information (including, for example, PRB position information such as a frequency and a time), a modulation scheme and a coding scheme (for example, 16QAM modulation and a 2/3 coding rate) corresponding to each downlink PRB, or the like) input from the scheduling unit 104, generates an OFDM signal, and outputs the OFDM signal to the radio unit 103a.

The radio unit 103a generates a radio signal by up-converting modulation data input from the OFDM modulation unit 102a into a radio frequency, and transmits the radio signal to the mobile station device 200 (see FIG. 7 to be described later) via the antenna unit A1. The radio unit 103a receives an uplink radio signal from the mobile station device 200 via the antenna unit A1, down-converts the uplink radio signal into a baseband signal, and outputs reception data to the channel estimation unit 105 and the DFT-S-OFDM demodulation unit 106.

The scheduling unit 104 performs processing of the MAC (Medium Access Control) layer. The scheduling unit 104 performs mapping of the logical channel and the transport channel, downlink and uplink scheduling (HARQ processing, transport format selection, and the like), and the like. Since the scheduling unit 104 integrates and controls processing units of the physical layers, interfaces are provided between the scheduling unit 104 and the antenna unit A1, the radio unit 103a, the channel estimation unit 105, the DFT-S-OFDM demodulation unit 106, the data control unit 101a, the OFDM modulation unit 102a, and the data extraction unit 107. However, their illustration is omitted in FIG. 6.

In downlink scheduling, the scheduling unit 104 generates scheduling information to be used in processing of selection of a downlink transport format (transmission format) (PRB allocation and modulation schemes, a coding scheme, and the like) for modulating data, retransmission control in the HARQ, and the downlink scheduling based on feedback information (a downlink channel feedback report (channel quality (CQI), the number of streams (RI), precoding information (PMI), and the like)), ACK/NACK feedback information for downlink data, or the like) received from the mobile station device 200, information of available downlink PRBs of each mobile station device, a buffer situation, scheduling information input from the upper layer 108, and the like. The scheduling information that is used in the downlink scheduling is output to the data control unit 101a and the data extraction unit 107.

In uplink scheduling, the scheduling unit 104 generates scheduling information to be used in processing of selection of an uplink transport format (transmission format) (PRB allocation and modulation schemes, a coding scheme, and the like) for modulating data and the uplink scheduling based on an estimation result of an uplink channel state (radio propagation channel state) output by the channel estimation unit 105, a resource allocation request from the mobile station device 200, information of available PRBs of each mobile station device 200, scheduling information input from the upper layer 108, and the like.

The scheduling information that is used in the uplink scheduling is output to the data control unit 101a and the data extraction unit 107.

The scheduling unit 104 maps the logical channel of the downlink input from the upper layer 108 to the transport channel, and outputs a mapping result to the data control unit 101a. Also, the scheduling unit 104 processes control data and the transport channel acquired in the uplink input from the data extraction unit 107 if necessary, maps a processing result to the logical channel of the uplink, and outputs a mapping result to the upper layer 108.

The channel estimation unit 105 estimates an uplink channel state from an uplink DRS for uplink data demodulation, and outputs an estimation result to the DFT-S-OFDM demodulation unit 106. Also, to perform the uplink scheduling, the uplink channel state is estimated from an uplink SRS and an estimation result is output to the scheduling unit 104.

An uplink communication scheme is assumed to be a single carrier scheme such as DFT-S-OFDM or the like, but a multi-carrier scheme such as an OFDM scheme may be used.

Based on the uplink channel state estimation result input from the channel estimation unit 105, the DFT-S-OFDM demodulation unit 106 performs demodulation processing by performing DFT-S-OFDM signal processing such as discrete Fourier transform (DFT) conversion, subcarrier mapping, IFFT conversion, filtering, and the like for modulation data input from the radio unit 103a, and outputs a processing result to the data extraction unit 107.

Based on the scheduling information from the scheduling unit 104, the data extraction unit 107 checks the accuracy of data input from the DFT-S-OFDM demodulation unit 106, and outputs a check result (acknowledgment signal ACK/ negative acknowledgement signal NACK) to the scheduling unit 104.

Also, based on the scheduling information input from the scheduling unit 104, the data extraction unit 107 separates the transport channel and the control data of the physical layer from data input from the DFT-S-OFDM demodulation unit 106, and outputs the transport channel and the control data to the scheduling unit 104.

The separated control data includes feedback information (a downlink channel feedback report (CQI, PMI, and RI) and ACK/NACK feedback information for downlink data) reported from the mobile station device 200, and the like.

The upper layer 108 performs processing of a packet data convergence protocol (PDCP) layer, a radio link control (RLC) layer, and a radio resource control (RRC) layer. Since the upper layer 108 integrates and controls processing units of the lower layers, interfaces are provided between the upper layer 108 and the scheduling unit 104, the antenna unit A1, the radio unit 103a, the channel estimation unit 105, the DFT-S-OFDM demodulation unit 106, the data control unit 101a, the OFDM modulation unit 102a, and the data extraction unit 107. However, their illustration is omitted in FIG. 6.

The upper layer 108 has a radio resource control unit 109. The radio resource control unit 109 performs management of various types of setting information, management of system information, paging control, management of a communication state of each mobile station device, mobility management of a handover and the like, management of a buffer situation of each mobile station device, management of connection setup of unicast and multicast bearers, management of a mobile station identifier (UEID), and the like.

The upper layer 108 transmits/receives information directed to another base station device and information directed to an upper node.

Figure 7:
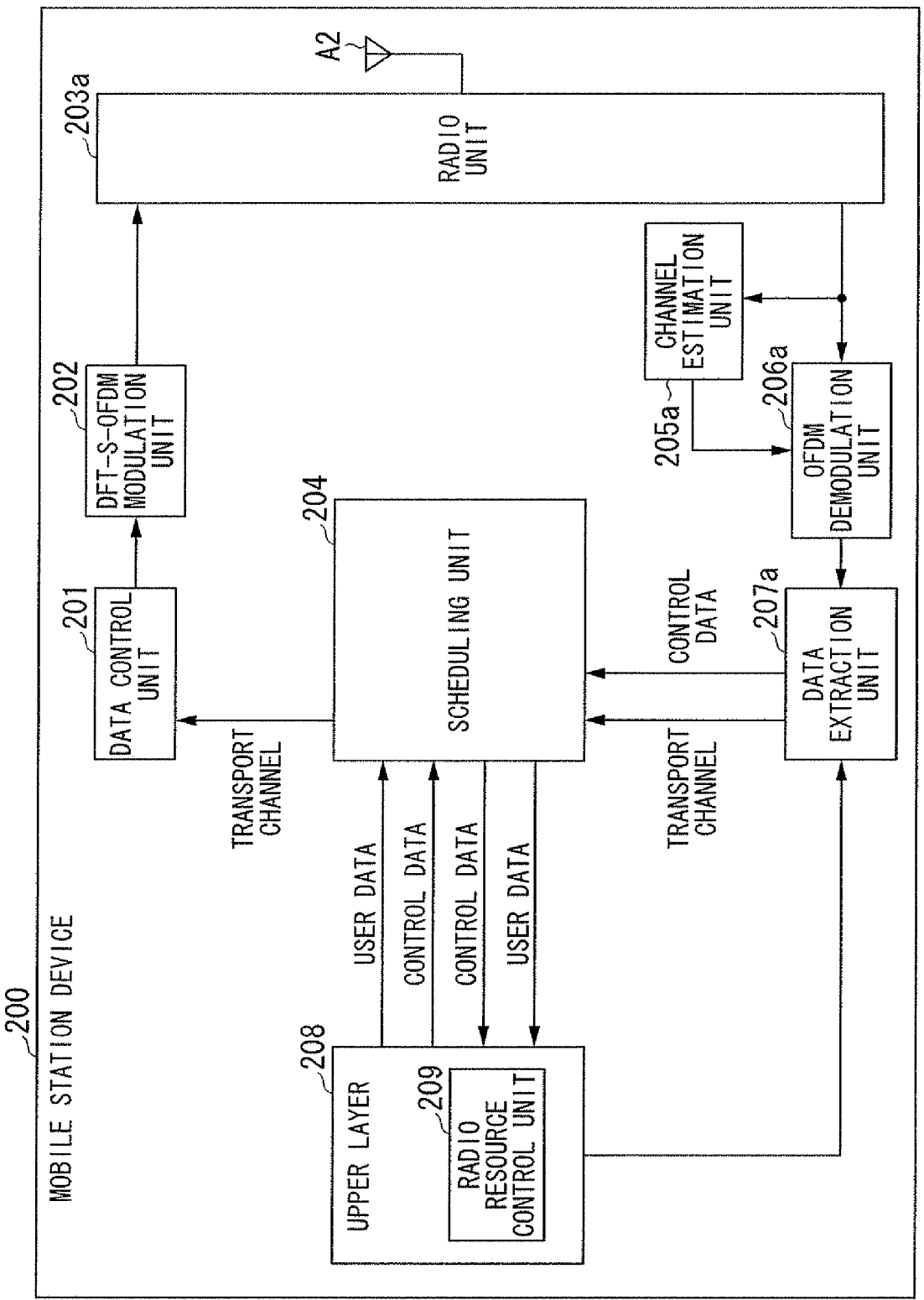
FIG. 7 is a schematic block diagram showing a configuration of a mobile station device 200 according to the first embodiment of the present invention.

FIG. 7 is a schematic block diagram showing a configuration of the mobile station device 200 according to the first embodiment of the present invention. The mobile station device 200 includes a data control unit 201, a DFT-S-OFDM modulation unit 202, a radio unit 203a, a scheduling unit 204, a channel estimation unit 205a, an OFDM demodulation unit 206a, a data extraction unit 207a, an upper layer 208, and an antenna unit A2.

The data control unit 201, the DFT-S-OFDM modulation unit 202, the radio unit 203a, the scheduling unit 204, the upper layer 208, and the antenna unit A2 constitute a transmission unit. The radio unit 203a, the scheduling unit 204, the channel estimation unit 205a, the OFDM demodulation unit 206a, the data extraction unit 207a, the upper layer 208, and the antenna unit A2 constitute a reception unit. The scheduling unit 204 constitutes a selection unit.

The antenna unit A2, the data control unit 201, the DFT-S-OFDM modulation unit 202, and the radio unit 203a perform processing of the physical layer of the uplink. The antenna unit A2, the radio unit 203a, the channel estimation unit 205a, the OFDM demodulation unit 206a, and the data extraction unit 207a perform processing of the physical layer of the downlink.

The data control unit 201 acquires the transport channel from the scheduling unit 204. The data control unit 201 maps the transport channel and a signal and a channel generated in the physical layer based on scheduling information input from the scheduling unit 204, to the physical channel. The data mapped as described above is output to the DFT-S-OFDM modulation unit 202.

The DFT-S-OFDM modulation unit 202 performs DFT-S-OFDM signal processing such as data modulation, DFT processing, subcarrier mapping, IFFT processing, CP insertion, filtering, and the like, generates a DFT-S-OFDM signal, and outputs the DFT-S-OFDM signal to the radio unit 203a.

An uplink communication scheme is assumed to be a single carrier scheme such as DFT-S-OFDM or the like, but a multi-carrier scheme such as an OFDM scheme may be used in place thereof.

The radio unit 203a generates a radio signal by up-converting modulation data input from the DFT-S-OFDM modulation unit 202 into a radio frequency, and transmits the radio signal to the base station device 100 (FIG. 6) via the antenna unit A2.

The radio unit 203a receives a radio signal modulated by downlink data from the base station device 100 via the antenna unit A2, down-converts the radio signal into a baseband signal, and outputs reception data to the channel estimation unit 205a and the OFDM demodulation unit 206a.

The scheduling unit 204 performs processing of the MAC layer. The scheduling unit 204 performs mapping of the logical channel and the transport channel, downlink and uplink scheduling (HARQ processing, transport format selection, and the like), and the like. Since the scheduling unit 104 integrates and controls processing units of the physical layers, interfaces are provided between the scheduling unit 104 and the antenna unit A2, the data control unit 201, the DFT-S-OFDM modulation unit 202, the channel estimation unit 205a, the OFDM demodulation unit 206a, the data extraction unit 207a, and the radio unit 203a. However, their illustration is omitted in FIG. 7.

In downlink scheduling, the scheduling unit 204 generates scheduling information to be used in reception control of the transport channel, the physical signal, and the physical channel, HARQ retransmission control, and the downlink scheduling based on scheduling information (transport format or HARQ retransmission information) and the like from the base station device 100 or the upper layer 208. The scheduling information that is used in the downlink scheduling is output to the data control unit 201 and the data extraction unit 207a.

In uplink scheduling, the scheduling unit 204 generates scheduling information to be used in scheduling processing for mapping the logical channel of the uplink input from the upper layer 208 to the transport channel and the uplink scheduling based on a buffer situation of the uplink input from the upper layer 208, uplink scheduling information from the base station device 100 input from the data extraction unit 207a, scheduling information input from the upper layer 208, and the like. The scheduling information is transport format or HARQ retransmission information, and the like.

In the uplink transport format, information reported from the base station device 100 is used. The scheduling information is output to the data control unit 201 and the data extraction unit 207a.

The scheduling unit 204 maps the logical channel of the uplink input from the upper layer 208 to the transport channel, and outputs a mapping result to the data control unit 201. The scheduling unit 204 also outputs a downlink channel feedback report (CQI, PMI, and RI) input from the channel estimation unit 205a or a CRC check result input from the data extraction unit 207a to the data control unit 201.

Also, the scheduling unit 204 processes the control data and the transport channel acquired in the downlink input from the data extraction unit 207a if necessary, maps a processing result to the logical channel of the downlink, and outputs a mapping result to the upper layer 208.

The channel estimation unit 205a estimates a downlink channel state from a downlink reference signal (RS) for downlink data modulation, and outputs an estimation result to the OFDM demodulation unit 206a.

The channel estimation unit 205a estimates a downlink channel state from the downlink RS so as to notify the base station device 100 of an estimation result of the downlink channel state (radio propagation channel state), converts an estimation result into a downlink channel feedback report (channel quality information and the like), and outputs the downlink channel feedback report to the scheduling unit 204.

The OFDM demodulation unit 206a performs OFDM demodulation processing for modulation data input from the radio unit 203a based on the downlink channel state estimation result input from the channel estimation unit 205a, and outputs a processing result to the data extraction unit 207a.

The data extraction unit 207a performs CRC for data input from the OFDM demodulation unit 206a, checks accuracy, and outputs a check result (ACK/NACK feedback information) to the scheduling unit 204.

The data extraction unit 207a separates the transport channel and the control data of the physical layer from data input from the OFDM demodulation unit 206a based on the scheduling information from the scheduling unit 204, and outputs the transport channel and the control data to the scheduling unit 204. The separated control data includes scheduling information such as downlink or uplink resource allocation or uplink HARQ control information. At this time, a search space (also referred to as a search region) of the PDCCH is decoded and downlink or uplink resource allocation or the like destined for its own station is extracted.

The upper layer 208 performs processing of the PDCP layer, the RLC layer, and the RRC layer. The upper layer 208 has a radio resource control unit 209. Since the upper layer 208 integrates and controls processing units of the lower layers, interfaces are provided between the upper layer 208 and the scheduling unit 204, the antenna unit A2, the data control unit 201, the DFT-S-OFDM modulation unit 202, the channel estimation unit 205a, the OFDM demodulation unit 206a, the data extraction unit 207a, and the radio unit 203a. However, their illustration is omitted in FIG. 7.

The radio resource control unit 209 performs management of various types of setting information, management of system information, paging control, management of a communication state of its own station, mobility management of a handover and the like, management of a buffer situation, management of connection setup of unicast and multicast bearers, and management of a mobile station identifier (UEID).

Figure 8:
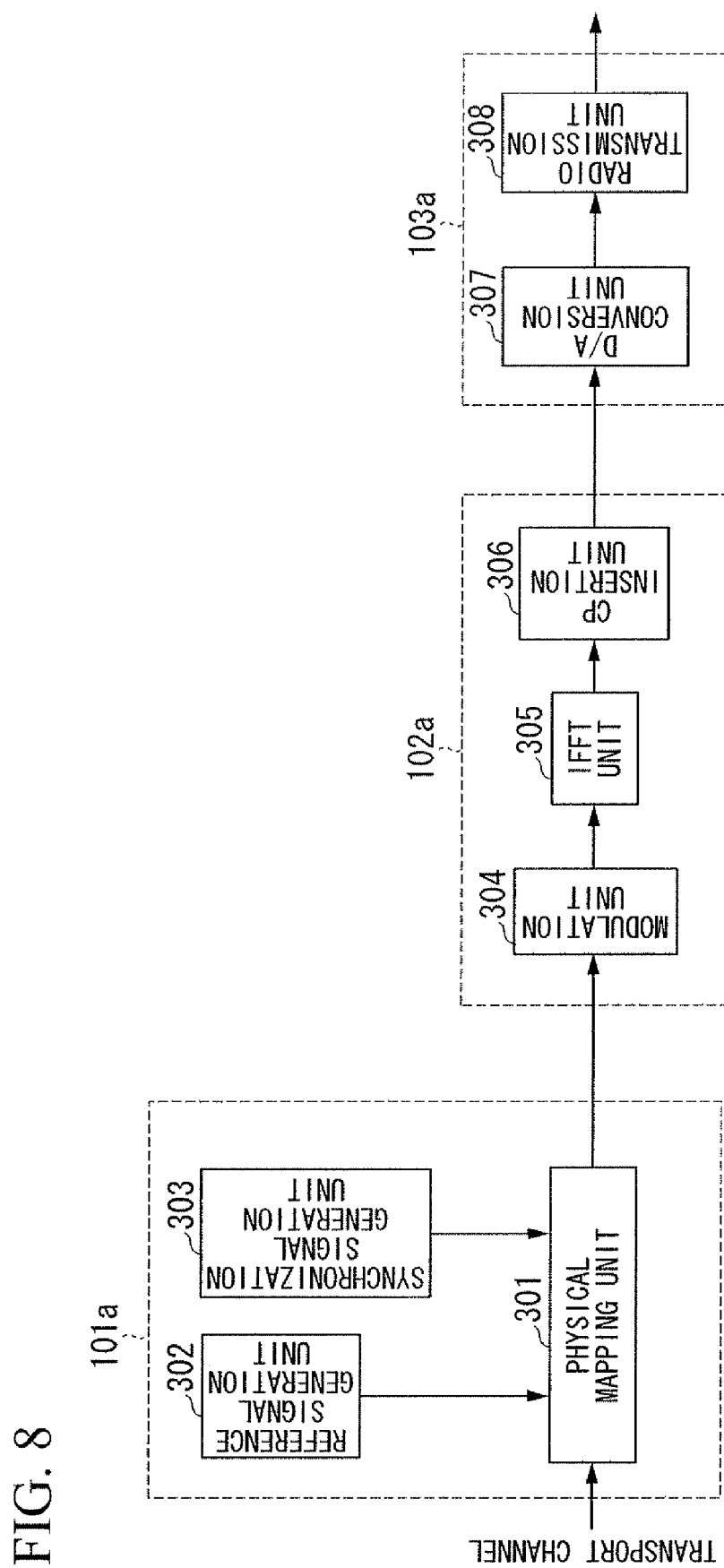
FIG. 8 is a schematic block diagram showing configurations of a data control unit 101a, an OFDM modulation unit 102a, and a radio unit 103a of the base station device 100 (FIG. 6) according to the first embodiment of the present invention.

FIG. 8 is a schematic block diagram showing configurations of the data control unit 101a, the OFDM modulation unit 102a, and the radio unit 103a related to the transmission unit of the base station device 100 (FIG. 6) according to the first embodiment of the present invention. Here, the case where frequency aggregation is applied to the downlink in the base station device 100 (FIG. 6) will be described.

The data control unit 101a includes the physical mapping unit 301, the reference signal generation unit 302, and the synchronization signal generation unit 303. The reference signal generation unit 302 generates a downlink reference signal and outputs the downlink reference signal to the physical mapping unit 301. The synchronization signal generation unit 303 generates a synchronization signal and outputs the synchronization signal to the physical mapping unit 301.

The physical mapping unit 301 maps the transport channel to PRBs based on the scheduling information, and multiplexes the reference signal generated in the reference signal generation unit 302 and the synchronization signal generated in the synchronization signal generation unit 303 into a physical frame.

At this time, the scheduling information includes information related to a system bandwidth. The physical mapping unit 301 maps the transport channel to PRBs arranged in the band of $N_1 W_{PRB}$ within the system band W1 and PRBs arranged in the band of $N_2 W_{PRB}$ within the system band W2, and inserts a null signal into subcarriers of a band other than the system bands W1 and W2 and a guard band. The physical mapping unit 301 maps the PBCH including information related to the system bandwidth.

The OFDM modulation unit 102a includes a modulation unit 304, an IFFT unit 305, and a CP insertion unit 306.

The modulation unit 304 generates a modulation symbol by modulating information mapped to each resource element of a physical frame based on a modulation scheme of QPSK modulation/16QAM modulation/64QAM modulation, or the like, and outputs the modulation symbol to the IFFT unit 305.

The IFFT unit 305 transforms a frequency domain signal into a time domain signal by performing IFFT for the modulation symbol (a modulation symbol arranged on a plane in the frequency axis and the time axis) generated in the modulation unit 304, and outputs the time domain signal to the CP insertion unit 306.

The CP insertion unit 306 generates an OFDM symbol by inserting a CP into the time domain signal, and outputs the OFDM symbol to the D/A conversion unit 307 of the radio unit 103a.

The radio unit 103a includes a D/A conversion unit 307 and a radio transmission unit 308.

The D/A conversion unit 307 converts an OFDM symbol sequence of an output of the CP insertion unit 306, which is a digital signal, into an analog signal, and outputs the analog signal to the radio transmission unit 308.

Figure 9:
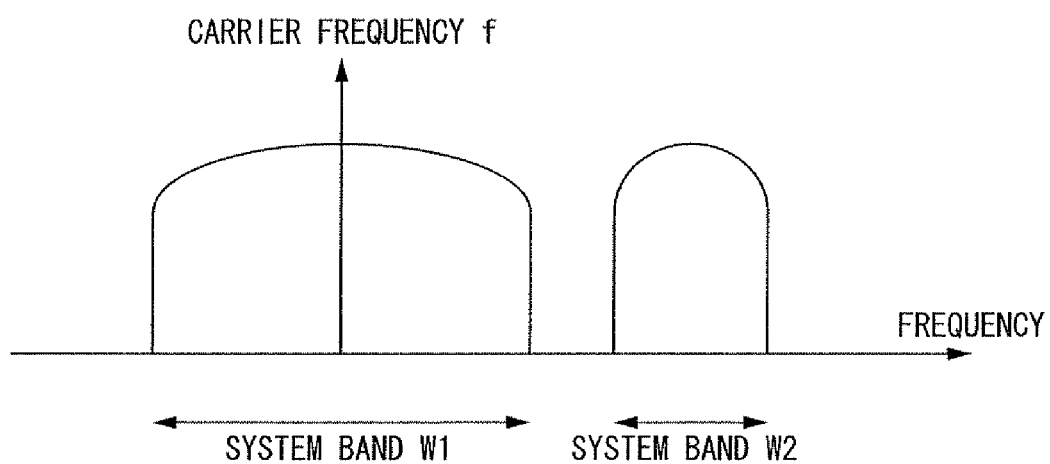
FIG. 9 is a diagram showing an example of a signal to be transmitted from the base station device 100 to the mobile station device 200 according to the first embodiment of the present invention.

The radio transmission unit 308 up-converts the analog signal into a radio frequency with use of a carrier frequency f shown in FIG. 9, and transmits the generated signal to the mobile station device 200 (FIG. 7) via the antenna unit A1. In FIG. 9, the horizontal axis represents a frequency. FIG. 9 shows the case where a signal is transmitted from the base station device 100 to the mobile station device 200 with use of the system band W1 and the system band W2.

Figure 10:
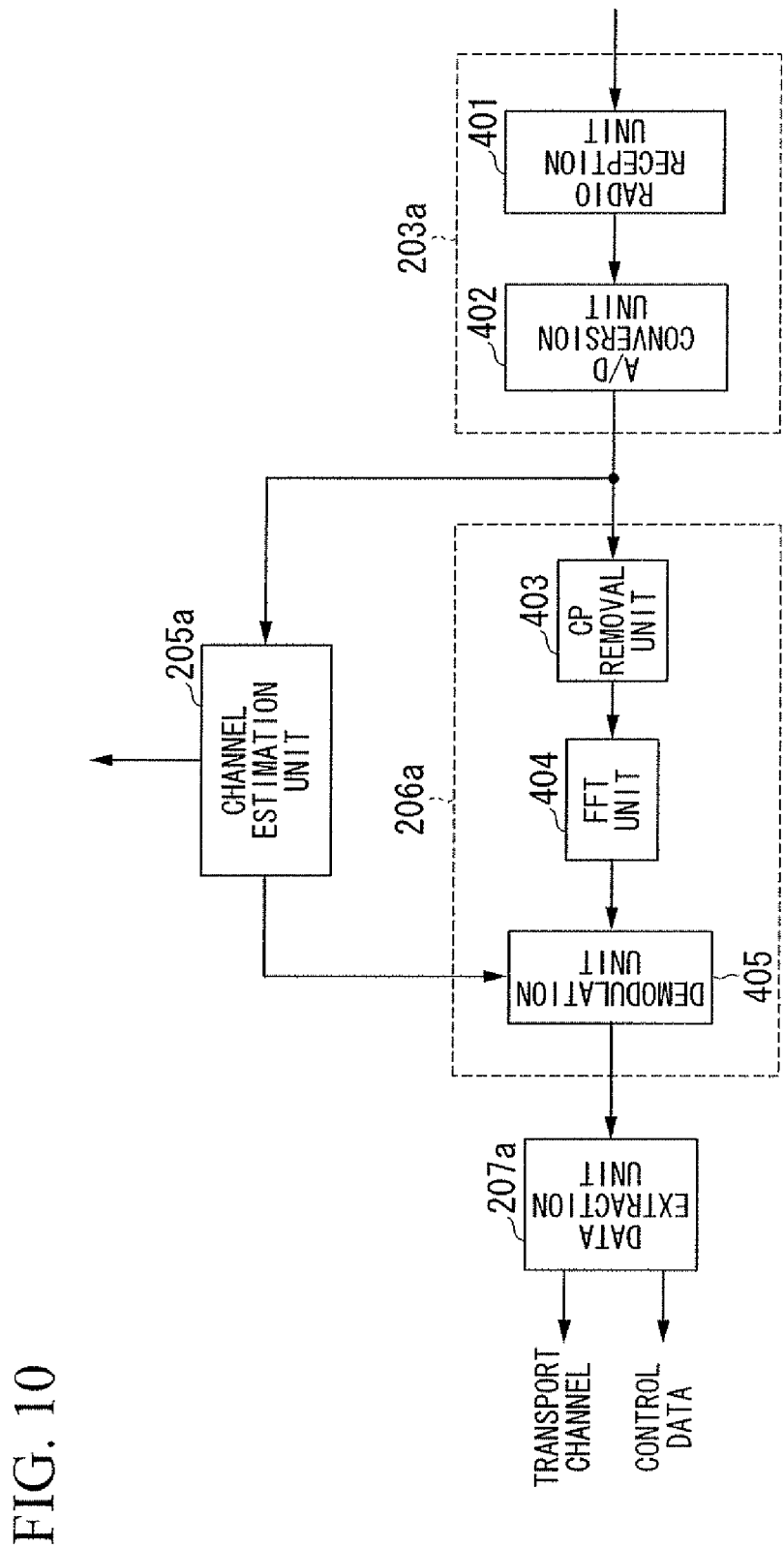
FIG. 10 is a schematic block diagram showing configurations of a radio unit 203a, a channel estimation unit 205a, an OFDM demodulation unit 206a, and a data extraction unit 207a of the mobile station device 200 (FIG. 7) according to the first embodiment of the present invention.

FIG. 10 is a schematic block diagram showing configurations of the radio unit 203a, the channel estimation unit 205a, the OFDM demodulation unit 206a, and the data extraction unit 207a related to the reception unit of the mobile station device 200 (FIG. 7) according to the first embodiment of the present invention. Here, the case where frequency aggregation is applied to the downlink in the mobile station device 200 will be described.

The radio unit 203a includes a radio reception unit 401 and an A/D conversion unit 402.

The radio reception unit 401 receives a signal from the base station device 100 (FIG. 6) via the antenna unit A2, and down-converts the received signal into a baseband with use of a carrier frequency f shown in FIG. 9. Also, the radio reception unit 401 acquires synchronization by referring to a synchronization signal inserted in advance into a signal by cell selection or reselection processing, and sets up and establishes a connection in the system bands W1 and W2 with use of information regarding the system bands reported from the scheduling unit 104 or the upper layer. The radio reception unit 401 uses an output of the A/D conversion unit 402 when synchronization is acquired using a digital signal.

The A/D conversion unit 402 converts an analog signal of the output of the radio reception unit 401 into a digital signal, and outputs the digital signal to the channel estimation unit 205a and the CP removal unit 403 of the OFDM demodulation unit 206a.

The OFDM demodulation unit 206a includes a CP removal unit 403, an FFT unit 404, and a demodulation unit 405. The CP removal unit 403 removes a CP part from the digital signal output from the A/D conversion unit 402.

A time domain signal from which the CP is removed in the CP removal unit 403 is transformed into a modulation symbol (a modulation symbol arranged on a plane in the frequency axis and the time axis) of resource elements in the FFT unit 404.

The demodulation unit 405 performs demodulation processing, which corresponds to the modulation scheme used in the modulation unit 304, for the modulation symbol into which the transformation is performed while referring to a propagation channel estimation value estimated in the propagation channel estimation unit 205a, and acquires a bit sequence (or bit likelihood information or the like).

If data extraction is prepared and set using information within the PBCH by cell selection or reselection processing, the data extraction unit 207a extracts broadcast information from PRBs of a band including the PBCH, and prepares and sets the data extraction in the system bands W1 and W2.

Alternatively, once the scheduling unit 104 is notified of the broadcast information or the upper layer is notified of the broadcast information via the scheduling unit 104, the data extraction is set in the system bands W1 and W2 based on instructions thereof. At this time, the scheduling unit 104 or the upper layer notifies the radio reception unit 401 of information regarding the system bands.

If data for which data extraction is already set in the system bands W1 and W2 is received (normal communication is performed), the data extraction unit 207a maps PRBs to the transport channel. At this time, the data extraction unit 207a removes a signal in subcarriers of a band other than the system bands W1 and W2 and a guard band, and maps PRBs arranged in a band of $N_1W_{PRB}$ within the system band W1 and PRBs arranged in a band of $N_2W_{PRB}$ within the system band W2 to the transport channel.

Figure 11:
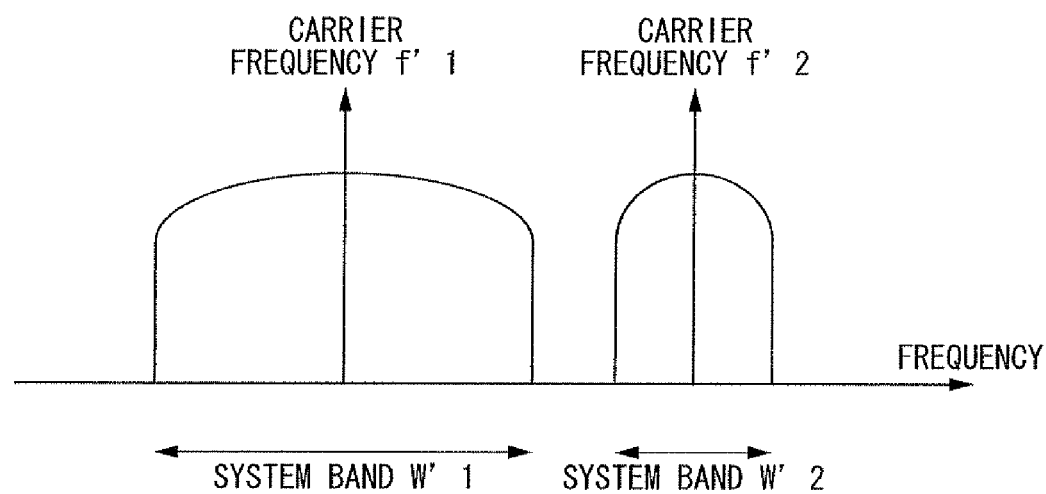
FIG. 11 is a diagram showing an example of bands used in the radio communication system according to the first embodiment of the present invention.
Figure 12:
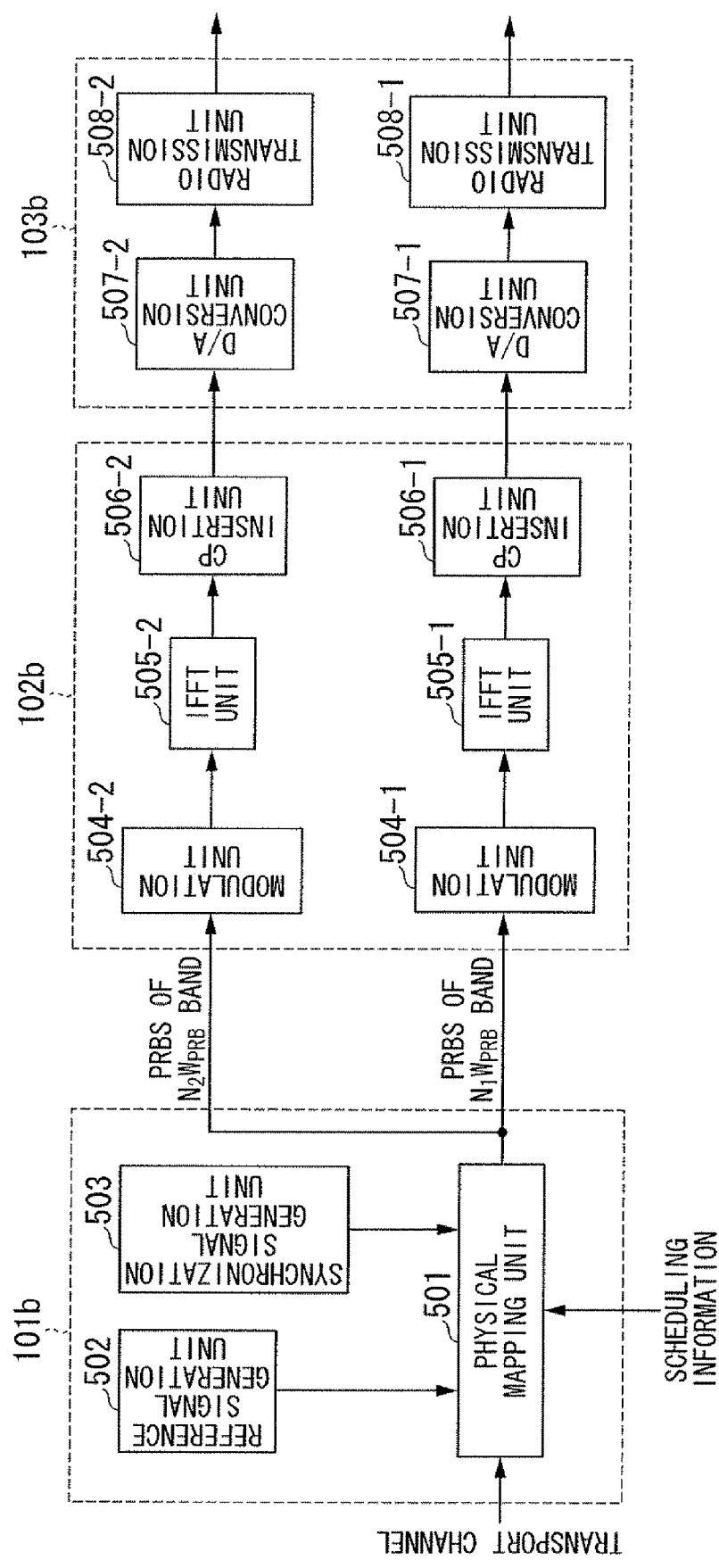
FIG. 12 is a schematic block diagram showing configurations of a data control unit 101b, an OFDM modulation unit 102b, and a radio unit 103b of the base station device according to a modified example of the first embodiment of the present invention.
Figure 13:
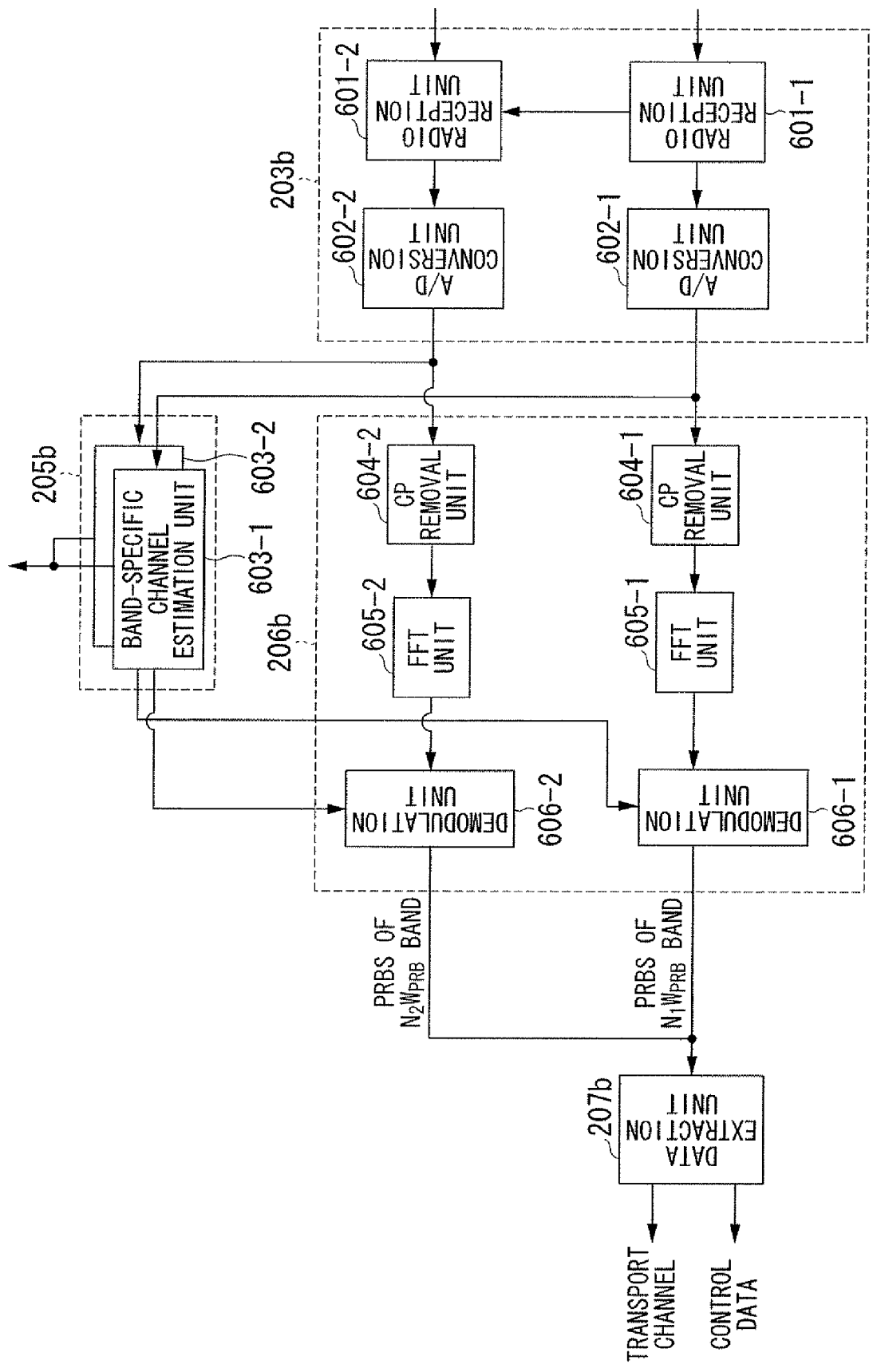
FIG. 13 is a schematic block diagram showing configurations of a radio unit 203b, a channel estimation unit 205b, an OFDM demodulation unit 206b, and a data extraction unit 207b of the mobile station device according to a modified example of the first embodiment of the present invention.

As a modified example of the first embodiment, the configuration of the base station device shown in FIG. 12 or the configuration of the mobile station device shown in FIG. 13 may be used. In this regard, if this configuration is used, carrier frequencies f'1 and f'2 as shown in FIG. 11 are used.

FIG. 11 is a diagram showing an example of bands used in the radio communication system according to the first embodiment of the present invention. In FIG. 11, the horizontal axis represents a frequency. In this modified example, a signal is transmitted from the base station device to the mobile station device with use of frequencies of system bands W'1 and W'2. The carrier frequency of the system band W'1 is f'1 and the carrier frequency of the system band W'2 is f'2.

The base station device may transmit a signal to the mobile station device with use of only one system band. In this case, it is preferable to use a configuration like the base station device 100 (FIG. 6) of the first embodiment. A configuration like the configuration shown in FIG. 4 can be used as a subframe structure related to this modified example.

The PBCH that is a channel including a synchronization signal, which is a signal for synchronization, and physical broadcast information is inserted into any one (here, the system band W'1) of the system bands.

The mobile station device first acquires frame synchronization by searching for the synchronization signal, and also acquires information within the PBCH. Information (information regarding an aggregation resource region including the system band W'2) indicating a system band is included in the information within the PBCH. The system bands W'1 and W'2 are received using the information.

At this time, $N_1$ PRBs are arranged in the system band W'1 and $N_2$ PRBs are arranged in the system band W'2. Thereby, a propagation channel characteristic in the inside of the PRB becomes continuous in any PRB. Thus, it is possible to prevent the degradation of accuracy of propagation channel estimation or reception quality measurement.

FIG. 12 is a schematic block diagram showing configurations of a data control unit 101b, an OFDM modulation unit 102b, and a radio unit 103b of the base station device according to a modified example of the first embodiment of the present invention. Here, the case where frequency aggregation is applied to the downlink in the base station device will be described.

The base station device according to the modified example of the first embodiment includes the data control unit 101b, the OFDM modulation unit 102b, and the radio unit 103b in place of the data control unit 101a, the OFDM modulation unit 102a, and the radio unit 103a (FIG. 8) of the base station device 100 according to the first embodiment.

The data control unit 101b includes a physical mapping unit 501, a reference signal generation unit 502, and a synchronization signal generation unit 503.

The reference signal generation unit 502 generates a downlink reference signal and outputs the downlink reference signal to the physical mapping unit 5011. The synchronization signal generation unit 503 generates a synchronization signal and outputs the synchronization signal to the physical mapping unit 501. The physical mapping unit 501 maps the transport channel to PRBs based on scheduling information, and also multiplexes the reference signal generated in the reference signal generation unit 502 and the synchronization signal generated in the synchronization signal generation unit 503 into a physical frame.

At this time, information related to system bandwidths W'1 and W'2 is included in the scheduling information. The physical mapping unit 501 maps the transport channel to PRBs arranged in a band of $N_1W_{PRB}$ within the system band W'1 and PRBs arranged in a band of $N_2W_{PRB}$ within the system band W'2.

The OFDM modulation unit 102b includes modulation units 504-1 and 504-2, IFFT units 505-1 and 505-2, and CP insertion units 506-1 and 506-2.

The modulation unit 504-1, the IFFT unit 505-1, and the CP insertion unit 506-1 process the PRBs arranged in the band of $N_1W_{PRB}$ within the system band W'1.

The modulation unit 504-1 generates a modulation symbol by modulating information mapped to each resource element of a physical frame based on a modulation scheme of QPSK modulation, 16QAM modulation, 64QAM modulation, or the like, and outputs the modulation symbol to the IFFT unit 505-1.

The IFFT unit 505-1 transforms a frequency domain signal into a time domain signal by performing IFFT for the modulation symbol (a modulation symbol arranged on a plane in the frequency axis and the time axis) generated in the modulation unit 504-1, and outputs the time domain signal to the CP insertion unit 506-1.

The CP insertion unit 506-1 generates an OFDM symbol by inserting a CP into the time domain signal, and outputs the OFDM symbol to a D/A conversion unit 507-1 of the radio unit 103b.

The modulation unit 504-2, the IFFT unit 505-2, and the CP insertion unit 506-2 process the PRBs arranged in the band of $N_2W_{PRB}$ within the system band W'2.

The modulation unit 504-2 generates a modulation symbol by modulating information mapped to each resource element of a physical frame based on a modulation scheme of QPSK modulation, 16QAM modulation, 64QAM modulation, or the like, and outputs the modulation symbol to the IFFT unit 505-2.

The IFFT unit 505-2 transforms a frequency domain signal into a time domain signal by performing IFFT for the modulation symbol (a modulation symbol arranged on a plane in the frequency axis and the time axis) generated in the modulation unit 504-2, and outputs the time domain signal to the CP insertion unit 506-2.

The CP insertion unit 506-2 generates an OFDM symbol by inserting a CP into the time domain signal, and outputs the OFDM symbol to a D/A conversion unit 507-2 of the radio unit 103b.

The radio unit 103b includes the D/A conversion units 507-1 and 507-2 and radio transmission units 508-1 and 508-2.

The D/A conversion unit 507-1 and the radio transmission unit 508-1 process the PRBs arranged in the band of $N_1W_{PRB}$ within the system band W'1.

The D/A conversion unit 507-1 converts an OFDM symbol sequence of an output of the CP insertion unit 506-1, which is a digital signal, into an analog signal, and outputs the analog signal to the radio transmission unit 508-1.

The radio transmission unit 508-1 up-converts the analog signal into a radio frequency with use of a carrier frequency W'1 shown in FIG. 11, and transmits the generated signal to the mobile station device via the antenna unit A1.

The D/A conversion unit 507-2 and the radio transmission unit 508-2 process the PRBs arranged in the band of $N_2W_{PRB}$ within the system band W'2.

The D/A conversion unit 507-2 converts an OFDM symbol sequence of an output of the CP insertion unit 506-2, which is a digital signal, into an analog signal, and outputs the analog signal to the radio transmission unit 508-2.

The radio transmission unit 508-2 up-converts the analog signal into a radio frequency with use of a carrier frequency W'2 shown in FIG. 11, and transmits the generated signal to the mobile station device via the antenna unit A1.

Here, blocks divided to perform the same processing for different signals have been described, but one circuit may be shared.

FIG. 13 is a schematic block diagram showing configurations of a radio unit 203b, a channel estimation unit 205b, an OFDM demodulation unit 206b, and a data extraction unit 207b of the mobile station device according to the modified example of the first embodiment of the present invention. Here, the case where frequency aggregation is applied to the downlink in the mobile station device will be described.

In FIG. 13, a signal output by a band-specific channel estimation unit 603-1 is input to a demodulation unit 606-1. A signal output by a band-specific channel estimation unit 603-2 is input to a demodulation unit 606-2.

The mobile station device according to the modified example of the first embodiment includes the radio unit 203b, the channel estimation unit 205b, the OFDM demodulation unit 206b, and the data extraction unit 207b in place of the radio unit 203a, the channel estimation unit 205a, the OFDM demodulation unit 206a, and the data extraction unit 207a (FIG. 10) of the mobile station device 200 according to the first embodiment.

The radio unit 203b includes radio reception units 601-1 and 601-2 and A/D conversion units 602-1 and 602-2.

The radio reception unit 601-1 receives a signal from the base station device via the antenna unit A2, and down-converts the received signal into a baseband with use of the carrier frequency f'1 shown in FIG. 11. Also, the radio reception unit 601-1 acquires synchronization by referring to a synchronization signal inserted in advance into a signal by cell selection or reselection processing, and sets up and establishes a connection in the system band W'1 with use of information regarding the system band reported from the scheduling unit 204 or the upper layer. The radio reception unit 601-1 uses an output of the A/D conversion unit 602-1 described below when synchronization is acquired using a digital signal.

The A/D conversion unit 602-1 converts an analog signal of an output of the radio reception unit 601-1 into a digital signal, and outputs the digital signal to the band-specific channel estimation unit 603-1 of the channel estimation unit 205b and the CP removal unit 604-1 of the OFDM demodulation unit 206b.

The radio reception unit 601-2 sets up and establishes a connection in the system band W'2 with use of information regarding the system band reported from the scheduling unit 204 or the upper layer, receives a signal from the base station device via the antenna unit A2, down-converts the received signal into a baseband with use of the carrier frequency f'2 shown in FIG. 11 based on timing of frame synchronization acquired in the radio reception unit 601-1, and outputs the down-converted signal to the A/D conversion unit 602-2.

The A/D conversion unit 602-2 converts an analog signal of an output of the radio reception unit 601-2 into a digital signal, and outputs the digital signal to the band-specific channel estimation unit 603-2 of the channel estimation unit 205b and the CP removal unit 604-2 of the OFDM demodulation unit 206b.

The channel estimation unit 205b includes the band-specific channel estimation units 603-1 and 603-2.

The band-specific channel estimation unit 603-1 performs channel estimation in the PRBs arranged in the band of $N_1W_{PRB}$ by referring to a reference signal in the PRBs arranged in the band of $N_1W_{PRB}$ in the system band W'1, and outputs an estimation result to the demodulation unit 606-1 of the OFDM demodulation unit 206b.

The band-specific channel estimation unit 603-2 performs channel estimation in the PRBs arranged in the band of $N_2W_{PRB}$ by referring to a reference signal in the PRBs arranged in the band of $N_2W_{PRB}$ in the system band W'2, and outputs an estimation result to the demodulation unit 606-2 of the OFDM demodulation unit 206b.

The OFDM demodulation unit 206b includes CP removal units 604-1 and 604-2, FFT units 605-1 and 605-2, and demodulation units 606-1 and 606-2.

The CP removal unit 604-1, the FFT unit 605-1, and the demodulation unit 606-1 process the PRBs arranged in the band of $N_1W_{PRB}$ in the system band W'1.

The CP removal unit 604-1 removes a CP part from the digital signal output from the A/D conversion unit 602-1.

A time domain signal from which a CP is removed in the CP removal unit 604-1 is transformed into a modulation symbol (a modulation symbol arranged on a plane in the frequency axis (the band of $N_1W_{PRB}$) and the time axis) of each resource element in the FFT unit 605-1, and the modulation symbol is output to the FFT unit 605-1.

The demodulation unit 606-1 performs demodulation processing, which corresponds to the modulation scheme used in the modulation unit 504-1, for the modulation symbol into which the transformation is performed while referring to a propagation channel estimation value estimated in the propagation channel estimation unit 603-1, and acquires a bit sequence (or bit likelihood information or the like).

The CP removal unit 604-2, the FFT unit 605-2, and the demodulation unit 606-2 process the PRBs arranged in the band of $N_2W_{PRB}$ in the system band W'2.

The CP removal unit 604-2 removes a CP part from the digital signal output from the A/D conversion unit 602-2, and outputs a removal result to the FFT unit 605-2.

A time domain signal from which a CP is removed in the CP removal unit 604-2 is transformed into a modulation symbol (a modulation symbol arranged on a plane in the frequency axis (the band of $N_2W_{PRB}$) and the time axis) of each resource element in the FFT unit 605-2, and the modulation symbol is output to the demodulation unit 606-2.

The demodulation unit 606-2 performs demodulation processing, which corresponds to the modulation scheme used in the modulation unit 504-2, for the modulation symbol into which the transformation is performed while referring to a propagation channel estimation value estimated in the propagation channel estimation unit 603-2, and acquires a bit sequence (or bit likelihood information or the like).

If data extraction is prepared and set using information within the PBCH by cell selection or reselection processing, the data extraction unit 207 extracts broadcast information from PRBs of a band including the PBCH, and prepares and sets the data extraction in the system bands W'1 and W'2.

Alternatively, once the scheduling unit 204 is notified of the broadcast information or the upper layer is notified of the broadcast information via the scheduling unit 204, the data extraction is set in the system bands W'1 and W'2 based on instructions thereof. At this time, the scheduling unit 204 or the upper layer notifies the radio reception units 601-1 and 601-2 of information regarding the system bands.

If data for which data extraction is already set in the system bands W'1 and W'2 is received (normal communication is performed), the data extraction unit 207b maps PRBs to the transport channel based on the scheduling information. At this time, the data extraction unit 207b maps PRBs arranged in the band of $N_1 W_{PRB}$ within the system band W'1, which is an output of the demodulation unit 606-1, and PRBs arranged in the band of $N_2 W_{PRB}$ within the system band W'2, which is an output of the demodulation unit 606-2, to the transport channel.

Here, blocks divided to perform the same processing for different signals have been described, but one circuit may be shared.

Processing of the base station device 100 and the mobile station device 200 will be described by returning to the description of the first embodiment.

A master region is a downlink frequency layer (system band) to be initially accessed by the mobile station device 200, and the mobile station device 200 can access another region (slave region) after acquiring a signal of the region. A downlink synchronization signal (SCH) by which at least downlink synchronization can be acquired is arranged.

The slave region is a downlink frequency layer (system band) to be accessed after the mobile station device 200 acquires information in the master region.

The master region and the slave region may be different for each mobile station device 200. That is, the master region for a certain mobile station device 200 may be configured to be the slave region of another mobile station device 200. In this case, the downlink synchronization signal (SCH) may be arranged even in the slave region for a certain mobile station device 200. The presence/absence of specific channels (the downlink synchronization signal (SCH), the physical downlink broadcast channel (PBCH), the BCCH, the PCCH, the CCCH, and/or the like) of the slave region is broadcast from the base station device 100 to the mobile station device 200 by the master region.

The master region and the slave region may be arranged at adjacent carrier frequencies or separated carrier frequencies.

Uplink and downlink PRB resource allocations are performed by the PDCCH. A format in which PRB resources of the master region are allocated, a format in which PRB resources of the slave region are allocated, and a format in which PRB resources of both the master and slave regions are allocated are prepared. The mobile station device 200 changes the format of the PDCCH to be monitored in response to detection of the fact that the mobile station device 200 can access the master region and/or the slave region.

Alternatively, the format directed to the mobile station device 200 to access only the master or slave region and the format directed to the mobile station device 200 to access both the master and slave regions are prepared by the PDCCH. The mobile station device 200 changes the format of the PDCCH to be monitored in response to detection of the fact that the master and/or slave regions can be accessed.

Figure 14:
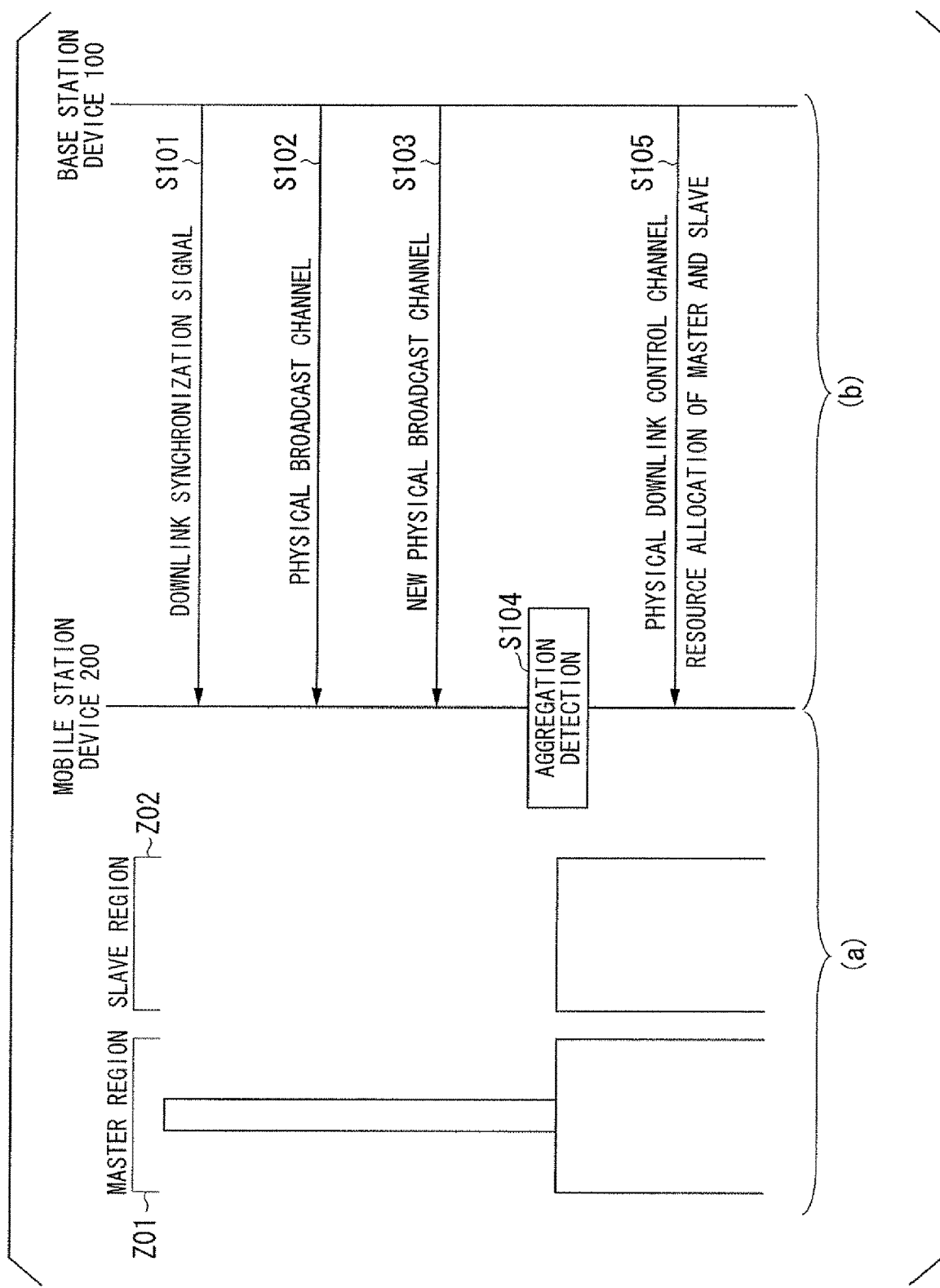
FIG. 14 is a sequence diagram and the like showing processing of the radio communication system according to the first embodiment of the present invention.

FIG. 14(b) is a sequence diagram showing processing of the radio communication system according to the first embodiment of the present invention.

First, the mobile station device 200 acquires a downlink synchronization signal (SCH) transmitted from the base station device 100 by cell selection or reselection processing, and performs downlink synchronization processing (step S101). At this time, the downlink synchronization signal (SCH) is arranged in a master region Z01 (see FIG. 14(a)).

The mobile station device 200 acquires the PBCH so that processing is performed in the master region Z01 (manipulation is performed in the master region Z01) (step S102). At this time, information regarding an aggregation resource region including a slave region Z02 (see FIG. 14(a)) (information indicating a system bandwidth (the number of resource blocks) of the master region Z01, a carrier frequency, a system bandwidth (the number of resource blocks), or the like of the slave region Z02, version information of the mobile station device 200, and/or the like), and the like is acquired from the PBCH.

Information regarding aggregation resources includes information for recognizing a width of a guard band between the master region Z01 and the slave region Z02 or between a plurality of system bands included in the entire system. Here, the width of the guard band between the system bands is defined as a width between effective bands excluding the guard band included in the system band. That is, it is a bandwidth between adjacent effective resource blocks within the system.

For example, if bandwidths each including a guard band are $W_1$, $W_2$, $W_3$, and $W_4$, and bandwidths between the system bands are $W_{D1-2}$, $W_{D2-3}$, and $W_{D3-4}$ in the case where system bands SW1, SW2, SW3, and SW4 are configured, effective bandwidths each excluding the guard band are automatically calculated from $N_1 W_{PRB}$, $N_2 W_{PRB}$, $N_3 W_{PRB}$, and $N_4 W_{PRB}$. At this time, system bandwidths each including the guard band (information of the master region Z01 may be omitted), bandwidths between the system bands, and effective bandwidths (information of the master region Z01 may be omitted) are included in the information regarding the aggregation resource region.

Figure 15:
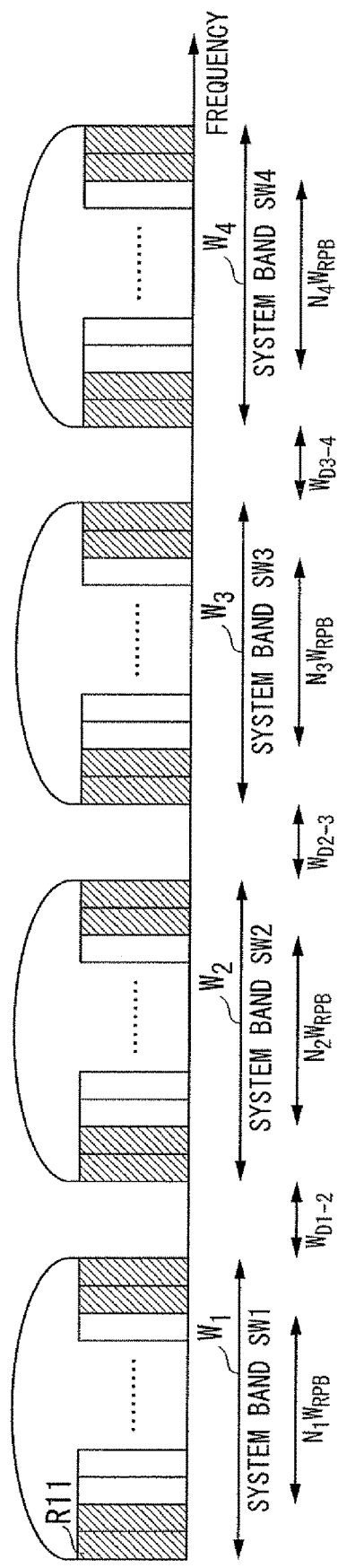
FIG. 15 is a diagram showing an example of a system band configuration used in the first embodiment of the present invention.

FIG. 15 is a diagram showing an example of a configuration of system bands used in the first embodiment of the present invention. In FIG. 15, the horizontal axis represents a frequency. In FIG. 15, a guard band is arranged in a shaded region (for example, a region R11). For example, as shown in FIG. 15, if system bands SW1, SW2, SW3, and SW4 are configured, it is assumed that bandwidths each including a guard band are $W_1$, $W_2$, $W_3$, and $W_4$, bandwidths between the system bands are $W_{D1-2}$, $W_{D2-3}$, and $W_{D3-4}$, and effective bandwidths each excluding the guard band are $N_1 W_{PRB}$, $N_2 W_{PRB}$, $N_3 W_{PRB}$, and $N_4 W_{PRB}$. In this case, the guard band included in each system band is automatically calculated from $W_i - N_i W_{PRB}$. At this time, system bandwidths each including the guard band (information of the master region Z01 may be omitted), bandwidths between the system bands, and effective bandwidths (information of the master region may be omitted) are included in the information regarding the aggregation resource region.

Figure 16:
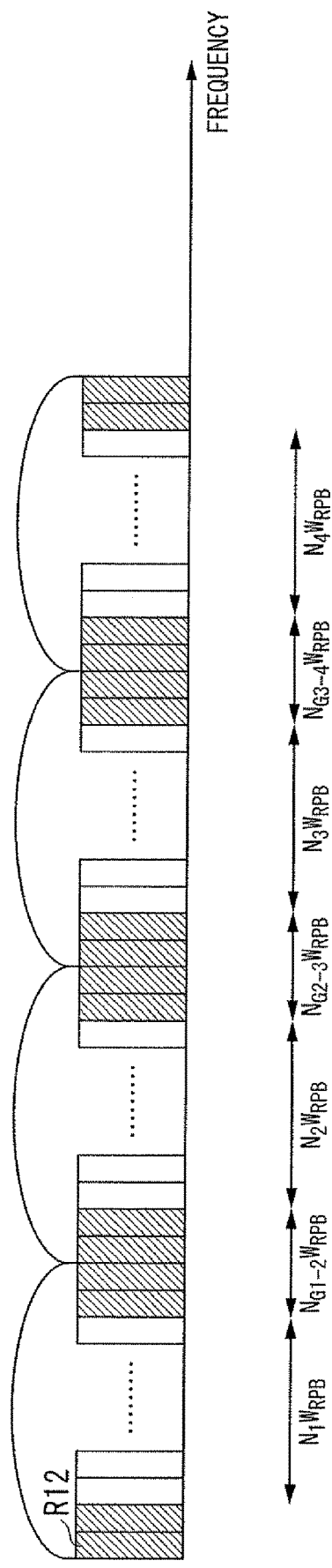
FIG. 16 is a diagram showing another example of a system band configuration used in the first embodiment of the present invention.

FIG. 16 is a diagram showing another example of a configuration of system bands used in the first embodiment of the present invention. In FIG. 16, the horizontal axis represents a frequency. In FIG. 16, a guard band is arranged in a shaded region (for example, a region R12). For example, as shown in FIG. 16, if system bands SW1, SW2, SW3, and SW4 are configured, effective bandwidths $N_1 W_{PRB}$, $N_2 W_{PRB}$, $N_3 W_{PRB}$, and $N_4 W_{PRB}$, a guard band $N_{G1-2} W_{PRB}$ between the system bands SW1 and SW2, a guard band $N_{G2-3} W_{PRB}$ between the system bands SW2 and SW3, and a guard band $N_{G3-4} W_{PRB}$ between the system bands SW3 and SW4 are broadcast. Each bandwidth may be expressed by a signal of the number of resource blocks, $N_i$. If $N_1$, $N_2$, $N_3$, and $N_4$, which are the number of PRBs, are the same value, it is preferable to broadcast only one value $N_i$. Processing of the mobile station device 200, which is a receiver, is facilitated by configuring the guard band by an integer multiple of $W_{PRB}$. If the guard bands $N_{G1-2}$, $N_{G2-3}$, and $N_{G3-4}$ are the same value, it is preferable to broadcast only one value $N_G$. In a situation where the mobile station device 200 can perform reception without the guard band, the guard band may be designated as 0. In this case, $N_G = 0$ is broadcast.

Indices capable of specifying all or each of $W_1$, $W_2$, $W_3$, $W_4$, $N_1 W_{PRB}$, $N_2 W_{PRB}$, $N_3 W_{PRB}$, $N_4 W_{PRB}$, $N_{G1-2} W_{PRB}$, $N_{G2-3} W_{PRB}$, and $N_{G3-4} W_{PRB}$ may be defined. Only the indices are broadcast, so that the mobile station device 200 may specify the above-described values from the indices.

If there is no information regarding aggregation resources, continuous processing is performed so that manipulation is directly performed in the master region Z01. Information regarding the aggregation resource region including the slave region Z02 may be arranged in a region separated from the PBCH.

For example, the PBCH is transmitted in first, second, third, and fourth OFDM symbols of a second slot (slot #1) of a first subframe (subframe #0), but a new PBCH may be transmitted in fifth to seventh OFDM symbols of a second slot (slot #1).

The base station device 100 includes information regarding an aggregation resource region including the slave region Z02 in the new PBCH, and transmits the new PBCH to the mobile station device 200 (step S103 of FIG. 14(b)).

The mobile station device 200 having the capability for aggregation acquires both of the PBCH transmitted in the first, second, third, and fourth OFDM symbols of the second slot (slot #1) and the new PBCH transmitted in the fifth to seventh OFDM symbols of the second slot (slot #1).

Thereby, information for the mobile station device 200 (the mobile station device 200 capable of accessing the master region Z01 and the slave region Z02) having the capability for aggregation and information for the mobile station device 200 (the mobile station device Z02 capable of accessing only the master region Z01) without the capability for aggregation can be efficiently separated.

If the information regarding the aggregation resource region is acquired (if the new PBCH is successfully decoded), the mobile station device 200 adjusts the radio unit to receive up to the slave region Z02, if necessary (step S104 of FIG. 14(b)).

If the adjustment of the radio unit 203a (FIG. 7) is not necessary (if the master region Z01 and the slave region Z02 are adjacent), a countermeasure is taken by adjusting a channel acquisition unit. Continuous processing is performed so that manipulation is performed in the aggregation resource region. That is, the mobile station device 200 performs decoding of the PDCCH on the assumption of aggregation (decoding of the PDCCH of a resource allocation information format after aggregation), and performs connection setup processing subsequent to the acquisition of broadcast information (BCCH) thereafter (step S105 of FIG. 14(b)).

In a band in which only the mobile station device 200 having the capability for aggregation is accommodated, the base station device 100 constantly uses the PDCCH of the resource allocation information format after the above-described aggregation, regardless of the capability of the mobile station device 200. That is, the base station device 100 does not need to know the master region Z01 to be accessed by the mobile station device 200.

FIG. 14(a) shows a frequency region in which the mobile station device 200 can perform reception in each step. In steps S101 to S104, the mobile station device 200 can receive regional resources necessary to acquire the PBCH arranged in part of the master region Z01. After step S104, the mobile station device 200 can receive regional resources of the master region Z01 and the slave region Z02.

In the first embodiment of the present invention, the radio unit 103a (also referred to as a signal transmission unit) of the base station device 100 (FIG. 6) transmits a signal including information, which specifies at least one slave region Z02 (also referred to as a second frequency band) different from the master region Z01 (also referred to as a first frequency band), to the mobile station device 200 with use of the master region Z01.

The data extraction unit 207a (also referred to as an information acquisition unit) of the mobile station device 200 (FIG. 7) acquires information, which is included in a signal transmitted from the base station device 100 with use of the master region Z01 and specifies the slave region Z02.

The scheduling unit 204 (also referred to as a frequency band specification unit) specifies the slave region Z02 based on information acquired by the data extraction unit 207a.

Specifically, the scheduling unit 204 specifies the slave region Z02 based on information included in the PBCH transmitted in a predetermined frequency bandwidth within the master region Z01. Also, the scheduling unit 204 may specify whether or not to include a specific channel (the PBCH or the like) located within the slave region Z02 based on information acquired by the data extraction unit 207a.

The radio unit 203a (also referred to as a communication unit) communicates with the base station device 100 by using the master region Z01 or the slave region Z02.

In the radio communication system according to the first embodiment of the present invention, the mobile station device 200 can initially access the master region Z01 and can acquire information specifying the slave region Z02 from information included in the master region Z01. Consequently, it is not necessary to separately receive information specifying the slave region Z02 from the base station device 100. Thus, at the initiation of communication, information to be transmitted from the base station device 100 to the mobile station device 200 can be reduced, and communication can be rapidly initiated between the base station device 100 and the mobile station device 200.

Second Embodiment

Next, a radio communication system according to the second embodiment of the present invention will be described. The radio communication system according to the second embodiment includes a base station device 100' and a mobile station device 200'. Since configurations of the base station device 100' and the mobile station device 200' according to the second embodiment are the same as those of the base station device 100 (FIG. 6) and the mobile station device 200 (FIG. 7) according to the first embodiment, description thereof is omitted. Hereinafter, only parts of the second embodiment different from the first embodiment will be described.

Figure 17:
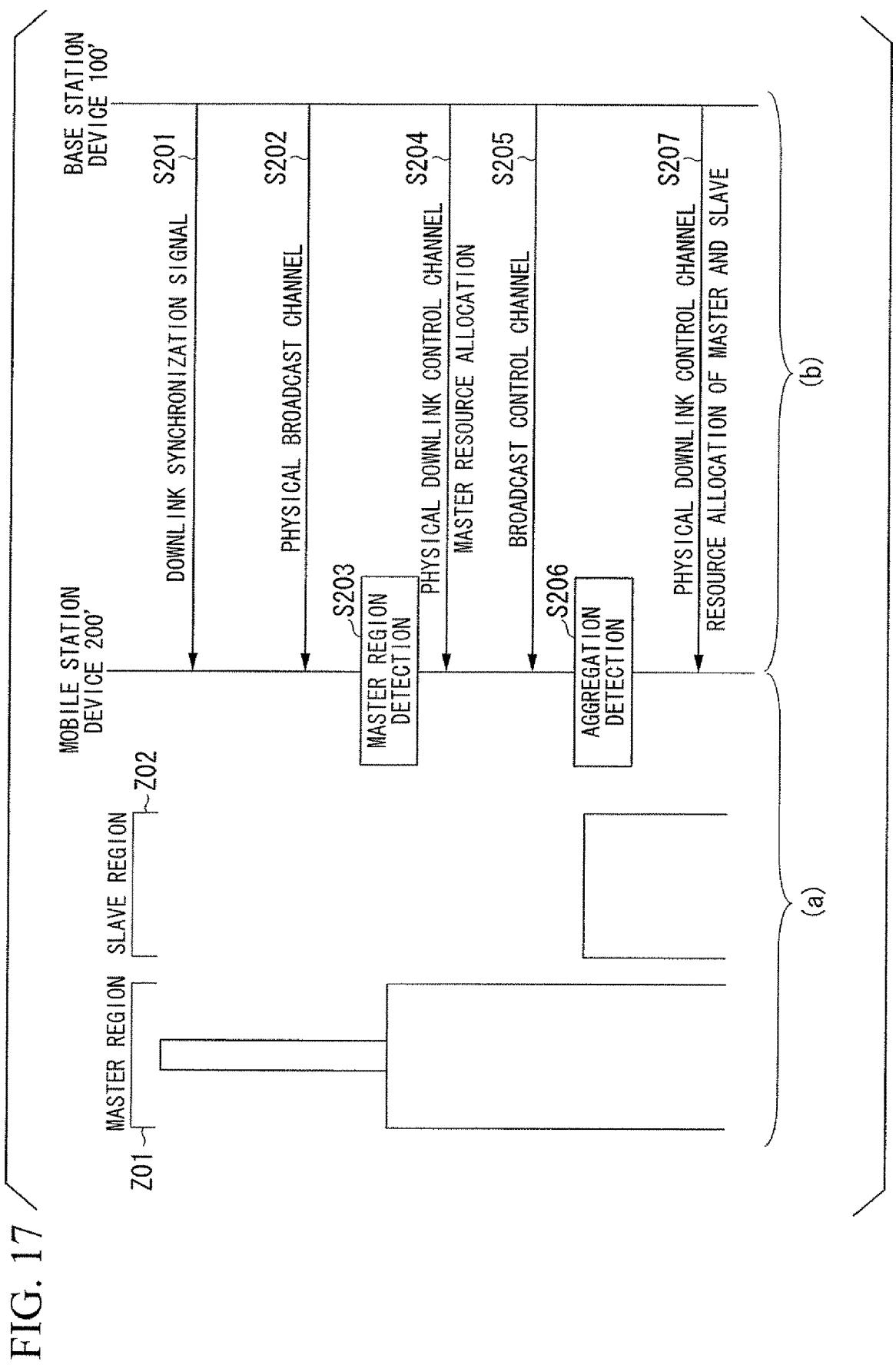
FIG. 17 is a sequence diagram showing processing of a radio communication system according to a second embodiment of the present invention.

FIG. 17(b) is a sequence diagram showing processing of the radio communication system according to the second embodiment of the present invention.

First, the mobile station device 200' acquires a downlink synchronization signal (SCH) of the base station device 100' by cell selection or reselection processing, and performs downlink synchronization processing (step S201). At this time, the downlink synchronization signal (SCH) is arranged in the master region Z01 (see FIG. 17(a)).

The mobile station device 200' acquires the PBCH so that manipulation is performed in the master region Z01 (step S202).

At this time, information regarding the master region Z01 (a system bandwidth (the number of resource blocks) of the master region Z01 or the like) is acquired from the PBCH (step S203).

Continuous processing is performed so that manipulation is performed in the master region Z01 (step S204).

The mobile station device 200' receives the BCCH mapped to the DL-SCH in the master region Z01 (Step 205).

Since the DL-SCH is transmitted by dynamic resources of the PDSCH designated by the PDCCH, resources can be dynamically changed. If information regarding an aggregation resource region (information indicating a system bandwidth (the number of resource blocks) of the master region Z01, information indicating a carrier frequency, a system bandwidth (the number of resource blocks), or the like of the slave region Z02 (see FIG. 17(a)), version information of the mobile station device 200', and/or the like) is acquired by the BCCH, the mobile station device 200' adjusts the radio unit to receive up to the slave region Z02 (step S206).

As in the first embodiment, information regarding aggregation resources includes information for recognizing a width of a guard band between the master region Z01 and the slave region Z02 or between a plurality of system bands included in the entire system.

Thereafter, continuous processing is performed so that manipulation is performed in the aggregation resource region or the master region Z01. That is, the mobile station device 200' performs decoding of the PDCCH on the assumption of aggregation (decoding of the PDCCH of a resource allocation information format after aggregation), and performs normal communication by performing connection setup processing subsequent to the acquisition of broadcast information (BCCH) thereafter (step S207).

When a plurality of master regions Z01 are provided in an accommodation band, the base station device 100' needs to detect the master region Z01 of the mobile station device 200'. The PRACH or RACH is used in the detection of the master region Z01 of the mobile station device 200'.

For example, the base station device 100' broadcasts information regarding the aggregation resource region and information indicating physical random access resources of the master region Z01 to each mobile station device 200'. The mobile station device 200' performs random access using physical random access resources indicated in an accessed region. Thus, the base station device 100' can determine what is a region used by the mobile station device 200' having the random access as the master region Z01 from physical random access resources used by the mobile station device 200', and can use the PDCCH, under assumption that the master region Z01 is specified, in random access processing and subsequent processing. In the CCCH, the master region Z01 of the mobile station device 200' is reported from the mobile station device 200' to the base station device 100' during a random access procedure.

If the mobile station device 200' having the capability for aggregation and the mobile station device 200' without the capability for aggregation are accommodated in the accommodation band, the base station device 100' needs to detect the capability for aggregation of the mobile station device 200'. The PRACH or RACH is used in the detection of the capability for aggregation of the mobile station device 200'.

For example, the base station device 100' broadcasts the information regarding the aggregation resource region and the information indicating physical random access resources for the mobile station device 200' to each mobile station device 200'. When the aggregation is used, random access is performed using the physical random access resources for the mobile station device 200' using the aggregation. Thus, the base station device 100' can determine whether or not the mobile station device 200' having the random access has the capability for aggregation from the used physical random access resources, and can use the PDCCH, under assumption that the aggregation is performed, in random access processing and subsequent processing. In the CCCH, the capability for aggregation of the mobile station device 200' may be reported from the mobile station device 200' to the base station device 100' during a random access procedure. A downlink band used during the random access procedure is the master region Z01.

Further, the mobile station device 200' may perform parallel processing so that manipulation is performed in the master region Z0. A mobile station device incapable of using the aggregation or a mobile station device incapable of decoding the information regarding the aggregation resource region performs processing so that manipulation is performed in the master region Z01.

The presence/absence of a specific channel (the downlink synchronization signal (SCH), the PBCH, the BCCH, or the like) within the slave region Z02 is broadcast to each mobile station device 200' by the master region Z0. If a plurality of slave regions Z02 exist, the base station device 100' broadcasts the presence/absence of a specific channel of each region to the mobile station device 200'. The mobile station device 200' specifies the presence/absence of the specific channel of each region from broadcast information. At this time, it is possible to efficiently operate the system without arranging the BCCH in the slave region Z02 by configuring the system so that the BCCH mapped to the DL-SCH is transmitted only in the master region Z01.

FIG. 17(a) shows a frequency region capable of being received by the mobile station device 200' in each step. In steps S201 to S203, the mobile station device 200' can receive regional resources necessary to acquire the PBCH arranged in part of the master region Z0. In steps S203 to S206, the mobile station device 200' can receive regional resources of the master region Z01. After step S206, the mobile station device 200' can receive regional resources of the master region Z01 and the slave region Z02.

In the second embodiment of the present invention, the radio unit 103a (also referred to as a signal transmission unit) of the base station device 100' (FIG. 6) transmits a signal including information, which specifies at least one slave region Z02 (also referred to as a second frequency band) different from the master region Z01 (also referred to as a first frequency band), to the mobile station device 200' with use of the master region Z01.

The data extraction unit 207a (also referred to as an information acquisition unit) of the mobile station device 200' (FIG. 7) acquires information, which is included in a signal transmitted from the base station device 100' with use of the master region Z01 and specifies the slave region Z02.

The scheduling unit 204 (also referred to as a frequency band specification unit) specifies the slave region Z02 based on information acquired by the data extraction unit 207*a*.

Specifically, the scheduling unit 204 specifies the slave region Z02 based on broadcast information included in the PDSCH transmitted in a predetermined frequency bandwidth within the master region Z01.

Also, the scheduling unit 204 may specify the slave region Z02 based on control information directed to a specific mobile station device 200' transmitted in the PDSCH within the master region Z01.

The radio unit 203*a* (also referred to as a communication unit) communicates with the base station device 100' by using the master region Z01 or the slave region Z02.

In this embodiment, the mobile station device 200' may acquire downlink control information, which designates resources within the master region Z01 and the slave region Z02, from the base station device 100' after resources of broadcast information is designated by a downlink control signal, which designates resources within the master region Z01, and the master region Z01 may be specified.

In the radio communication system according to the second embodiment of the present invention, the mobile station device 200' can initially access the master region Z01 and can acquire information specifying the slave region Z02 from the information included in the master region Z0. Consequently, it is not necessary to separately receive information specifying the slave region Z02 from the base station device 100'. Thus, it is possible to reduce information to be transmitted from the base station device 100' to the mobile station device 200' at the initiation of communication, and to rapidly initiate communication between the base station device 100' and the mobile station device 200'.

Specifically, since information regarding the aggregation resource region is acquired by receiving the BCCH mapped to the DL-SCH, there is an advantageous effect in that resources can be dynamically changed.

Third Embodiment

Next, a radio communication system according to the third embodiment of the present invention will be described. The radio communication system according to the third embodiment includes a base station device 100" and a mobile station device 200". Since configurations of the base station device 100" and the mobile station device 200" according to the second embodiment are the same as those of the base station device 100" (FIG. 6) and the mobile station device 200" (FIG. 7) according to the first embodiment, description thereof is omitted. Hereinafter, only parts of the third embodiment different from the first embodiment will be described.

Figure 18:
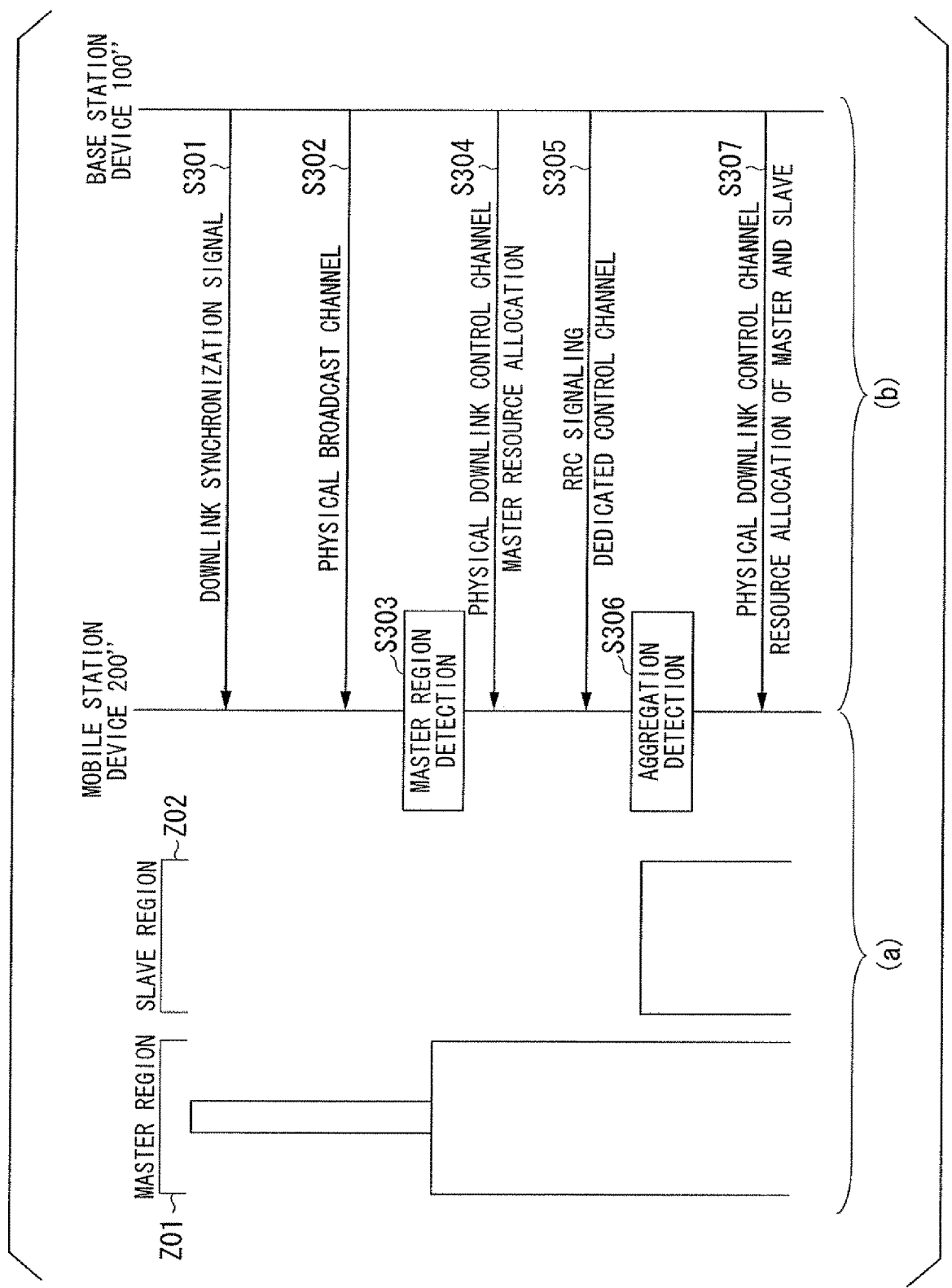
FIG. 18 is a sequence diagram showing processing of a radio communication system according to a third embodiment of the present invention.

FIG. 18(*b*) is a sequence diagram showing processing of the radio communication system according to the third embodiment of the present invention.

First, the mobile station device 200" acquires a downlink synchronization signal (SCH) of the base station device 100" by cell selection or reselection processing, and performs downlink synchronization processing (step S301). At this time, the downlink synchronization signal (SCH) is arranged in the master region Z01 (see FIG. 18(*a*)).

The mobile station device 200" acquires the PBCH so that manipulation is performed in the master region Z01 (step S302). At this time, information regarding the master region Z01 (a system bandwidth (the number of resource blocks) of the master region Z01 or the like) is acquired from the PBCH (step S303). Continuous processing is performed so that manipulation is performed in the master region Z01 (step S304).

The mobile station device 200" performs RRC connection establishment procedure by the master region Z01 and establishes a communication state (RRC connection state). In RRC connection setup (the CCCH (RRC signaling)) during the RRC connection establishment procedure or the DCCH (RRC signaling) directed to the mobile station device 200" during communication, information regarding an aggregation resource region (information indicating a system bandwidth (the number of resource blocks) of the master region Z01, information indicating a carrier frequency, a system bandwidth (the number of resource blocks), or the like of the slave region Z02 (see FIG. 18(*a*)), version information of the mobile station device 200", and/or the like) is reported from the base station device 100" to the mobile station device 200" (step S305).

The CCCH or DCCH is mapped to the DL-SCH in the master region Z0. Since the DL-SCH is transmitted by dynamic resources of the PDSCH designated by the PDCCH, resources can be dynamically changed.

The mobile station device 200" acquiring information regarding an aggregation resource region adjusts the radio unit 203*a* (FIG. 7) to receive up to the slave region Z02 (step S306). Thereafter, continuous processing is performed so that manipulation is performed in the aggregation resource region or the aggregation resource region and the master region Z0.

That is, the mobile station device 200" performs decoding of the PDCCH on the assumption of aggregation (decoding of the PDCCH of a resource allocation information format after aggregation) after checking the CCCH or DCCH (RRC signaling) (step S307).

When a plurality of master regions Z01 are provided in an accommodation band, the base station device 100" needs to detect the master region Z01 of the mobile station device 200". As in the second embodiment, the master region Z01 of the mobile station device 200" is detected using the PRACH or RACH, or the master region Z01 of the mobile station device 200" is reported from the mobile station device 200" to the base station device 100" by the CCCH during a random access procedure.

The master region Z01 of the mobile station device 200" can be designated from the base station device 100" by the DCCH (RRC signaling), and can be changed.

If a mobile station device 200" having the capability for aggregation and a mobile station device 200" without the capability for aggregation are accommodated in the accommodation band, the base station device 100" needs to detect the capability for aggregation of the mobile station device 200".

The base station device 100" uses information from the upper layer in the detection of the capability for aggregation of the mobile station device 200". The base station device 100" determines whether or not the mobile station device 200" having random access has the capability for aggregation. If the base station device 100" instructs the mobile station device 200" to use aggregation resources, the aggregation resources are designated by the DCCH (RRC signaling).

By the CCCH, the capability for aggregation of the mobile station device 200" may be reported from the mobile station device 200" to the base station device 100" during the random access procedure.

Further, the mobile station device 200" may perform parallel processing so that manipulation is performed in the master region Z01. The mobile station device 200", which does not acquire the information regarding the aggregation resource region, may perform processing so that manipulation is performed in the master region Z01.

The presence/absence of a specific channel (the downlink synchronization signal (SCH), the PBCH, the BCCH, or the like) within the slave region Z02 is broadcast by the master region Z0. The presence/absence of the specific channel within the slave region Z02 is reported from the base station device 100" to the mobile station device 200" by dedicated control information. The mobile station device 200" specifies the presence/absence of a specific channel of each region from broadcast information or dedicated control information.

If a plurality of slave regions Z02 exist, the base station device 100" reports the presence/absence of a specific channel of each region to the mobile station device 200". At this time, it is possible to efficiently operate the system without arranging the BCCH in the slave region Z02 by configuring the system so that the BCCH mapped to the DL-SCH is transmitted only in the master region Z0.

FIG. 18(*a*) shows a frequency region capable of being received by the mobile station device 200" in each step. In steps S301 to S303, the mobile station device 200" can receive regional resources necessary to acquire the PBCH arranged in part of the master region Z01. In steps S303 to S306, the mobile station device 200" can receive regional resources of the master region Z0. After step S306, the mobile station device 200" can receive regional resources of the master region Z01 and the slave region Z02.

In the radio communication system according to the third embodiment of the present invention, the mobile station device 200" can initially access the master region Z01 and can acquire information specifying the slave region Z02 from the information included in the master region Z0. Consequently, it is not necessary to separately receive information specifying the slave region Z02 from the base station device 100" as in the first embodiment. Thus, it is possible to reduce information to be transmitted from the base station device 100" to the mobile station device 200" at the initiation of communication, and to rapidly initiate communication.

Specifically, since information regarding the aggregation resource region is acquired by receiving the BCCH mapped to the DL-SCH, there is an advantageous effect in that aggregation resources to each of specific mobile station devices can be changed in application.

In the above-described embodiments, for convenience of description, the expressions of the capability for aggregation and the information regarding the aggregation resource region has been used, but the expressions may respectively indicate versions (a release version, an operation version, and the like) of the mobile station devices (the mobile station devices 200, 200', and 200") and information regarding a region for a new version of mobile station device. That is, the mobile station device not having the capability for aggregation exists if the release version of the mobile station device is old, and the capability for aggregation is provided if the release version of the mobile station device is new.

The system configured by aggregating a plurality of system bands has been described in the above-described embodiments, but one system may be configured by a plurality of sub system bands. Each system band (or sub system band) is also called a carrier component. This indicates a region where the system is operated by a specific receiver or transmitter focusing on a carrier frequency at the center of carrier components.

An example in which the base station devices (the base station devices 100, 100', and 100") correspond in one-to-one relation to the mobile station devices (the mobile station devices 200, 200', and 200") has been described for convenience of description in the above-described embodiments, but a plurality of base station devices and mobile station devices may be provided. The mobile station device is not limited to a mobile terminal, and may be realized by embedding a function of the mobile station device in the base station device or a fixed terminal.

In the above-described embodiments, a program for implementing functions within the base station device or functions of the mobile station device may be recorded on a computer readable recording medium. The base station device or the mobile station device may be controlled by enabling a computer system to read and execute the program recorded on the recording medium. The "computer system" used herein includes an OS and hardware, such as peripheral devices.

The "computer readable recording medium" is a portable medium such as a flexible disc, magneto-optical disc, ROM and CD-ROM, and a storage device, such as a hard disk, built in the computer system. Furthermore, the "computer readable recording medium" may also include a medium that dynamically holds a program for a short period of time, such as a communication line when a program is transmitted via a network such as the Internet or a communication network such as a telephone network, and a medium that holds a program for a fixed period of time, such as a volatile memory in a computer system serving as a server or client in the above situation. The program may be one for implementing part of the above functions, or the above functions may be implemented in combination with a program already recorded on the computer system.

The embodiments of the present invention have been described in detail with reference to the drawings. However, specific configurations are not limited to the embodiments and may include any design in the scope without departing from the subject matter of the present invention.

INDUSTRIAL APPLICABILITY

The present invention is applicable to a communication system, a mobile station device, a communication method, and the like that can reduce information to be transmitted from a base station device to the mobile station device at the initiation of communication and that can rapidly initiate communication.

REFERENCE SYMBOLS

100: Base station device
101*a*, 101*b*: Data control unit
102*a*, 102*b*: OFDM modulation unit
103*a*, 103*b*: Radio unit
104: Scheduling unit
105: Channel estimation unit
106: DFT-S-OFDM demodulation unit
107: Data extraction unit
108: Upper layer
200: Mobile station device
201: Data control unit
202: DFT-S-OFDM modulation unit
203*a*, 203*b*: Radio unit 204: Scheduling unit
205a, 205b: Channel estimation unit
206a, 206b: OFDM demodulation unit
207a, 207b: Data extraction unit
208: Upper layer
301: Physical mapping unit
302: Reference signal generation unit
303: Synchronization signal generation unit
304: Modulation unit
305: IFFT unit
306: CP insertion unit
307: D/A conversion unit
308: Radio transmission unit
401: Radio reception unit
402: A/D conversion unit
403: CP removal unit
404: FFT unit
405: Demodulation unit
501: Physical mapping unit
502: Reference signal generation unit
503: Synchronization signal generation unit
504-1, 504-2: Modulation unit
505-1, 505-2: IFFT unit
506-1, 506-2: CP insertion unit
507-1, 507-2: D/A conversion unit
508-1, 508-2: Radio transmission unit
601-1, 601-2: Radio reception unit
602-1, 602-2: A/D conversion unit
603-1, 603-2: Band-specific channel estimation unit
604-1, 604-2: CP removal unit
605-1, 605-2: FFT unit
606-1, 606-2: Demodulation unit
A1, A2: Antenna unit

The invention claimed is:

1. A mobile station device comprising:
reception circuitry configured to and/or programmed to receive, from a base station device, first information via radio resource control (RRC) signaling on a physical downlink shared channel (PDSCH) using a first downlink carrier and second information on a physical downlink control channel (PDCCH); and
processing circuitry configured and/or programmed to, in a case that the first information is received, communicate with the base station device by aggregate use of the first downlink carrier and a second downlink carrier, wherein
the first information indicates a quantity of physical resource blocks (PRBs) of downlink effective bandwidth of the second downlink carrier to change from non-aggregate use of the first downlink carrier to aggregate use of the first downlink carrier and the second downlink carrier,
the second information indicates allocation of one or more physical resource blocks (PRBs) within the second downlink carrier,
each of the first downlink carrier and the second downlink carrier has its own downlink effective bandwidth, and
the downlink effective bandwidth being system bandwidth excluding guard bands.

2. A base station device comprising:
transmission circuitry configured to and/or programmed to transmit, to a mobile station device, first information via radio resource control (RRC) signaling on a physical downlink shared channel (PDSCH) using a first downlink carrier and second information on a physical downlink control channel (PDCCH); and
processing circuitry configured and/or programmed to, in a case that the first information is transmitted, communicate with the mobile station device by aggregate use of the first downlink carrier and a second downlink carrier, wherein
the first information indicates a quantity of physical resource blocks (PRBs) of downlink effective bandwidth of the second downlink carrier to change from non-aggregate use of the first downlink carrier to aggregate use of the first downlink carrier and the second downlink carrier,
the second information indicates allocation of one or more physical resource blocks (PRBs) within the second downlink carrier,
each of the first downlink carrier and the second downlink carrier has its own downlink effective bandwidth, and
the downlink effective bandwidth being system bandwidth excluding guard bands.

3. A communication method for a mobile station device, the communication method comprising:
receiving, from a base station device, first information via radio resource control (RRC) signaling on a physical downlink shared channel (PDSCH) using a first downlink carrier and second information on a physical downlink control channel (PDCCH); and
communicating with the base station device by aggregate use of the first downlink carrier and a second downlink carrier in a case that the first information is received, wherein
the first information indicates a quantity of physical resource blocks (PRBs) of downlink effective bandwidth of the second downlink carrier to change from non-aggregate use of the first downlink carrier to aggregate use of the first downlink carrier and the second downlink carrier,
the second information indicates allocation of one or more physical resource blocks (PRBs) within the second downlink carrier,
each of the first downlink carrier and the second downlink carrier has its own downlink effective bandwidth, and
the downlink effective bandwidth being system bandwidth excluding guard bands.

4. A communication method for a base station device, the communication method comprising:
transmitting, to a mobile station device, first information via radio resource control (RRC) signaling on a physical downlink shared channel (PDSCH) using a first downlink carrier and second information on a physical downlink control channel (PDCCH); and
communicating with the mobile station device by aggregate use of the first downlink carrier and a second downlink carrier in a case that the first information is transmitted, wherein
the first information indicates a quantity of physical resource blocks (PRBs) of downlink effective bandwidth of the second downlink carrier to change from non-aggregate use of the first downlink carrier to aggregate use of the first downlink carrier and the second downlink carrier,
the second information indicates allocation of one or more physical resource blocks (PRBs) within the second downlink carrier,
each of the first downlink carrier and the second downlink carrier has its own downlink effective bandwidth, and
the downlink effective bandwidth being system bandwidth excluding guard bands.

5. The mobile station device of claim 1, wherein the mobile station device changes from the non-aggregate use of the first downlink carrier to the aggregate use of the first downing carrier and the second downlink carrier in response to the first information.

6. The base station device of claim 2, wherein the mobile station device changes from the non-aggregate use of the first downlink carrier to the aggregate use of the first downing carrier and the second downlink carrier in response to the first information.

7. The communication method of claim 3, wherein the communicating changes the mobile station device from the non-aggregate use of the first downlink carrier to the aggregate use of the first downing carrier and the second downlink carrier in response to the first information.

8. The communication method of claim 4, wherein the communicating causes the mobile station device to change from the non-aggregate use of the first downlink carrier to the aggregate use of the first downing carrier and the second downlink carrier in response to the first information.

* * * * *